(12) United States Patent
Myers

(10) Patent No.: US 6,233,254 B1
(45) Date of Patent: May 15, 2001

(54) USE OF FEATURE CHARACTERISTICS INCLUDING TIMES OF OCCURRENCE TO REPRESENT INDEPENDENT BIT STREAMS OR GROUPS OF BITS IN DATA TRANSMISSION SYSTEMS

(76) Inventor: Glen A. Myers, 279 Laureles Grade Rd., Salinas, CA (US) 93908

( * ) Notice: Subject to any disclaimer, the term of this patent is extended or adjusted under 35 U.S.C. 154(b) by 0 days.

(21) Appl. No.: 09/045,225

(22) Filed: Mar. 20, 1998

Related U.S. Application Data

(63) Continuation-in-part of application No. 08/870,469, filed on Jun. 6, 1997.

(51) Int. Cl.[7] ............................................. H04J 1/00
(52) U.S. Cl. ............................................................ 370/480
(58) Field of Search ....................................... 370/441, 442, 370/341, 347, 535, 537, 342, 480, 205, 206, 208, 212–215; 375/245, 208, 209, 309; 329/112, 316, 300, 325, 336, 312, 330; 331/2; 455/206

(56) References Cited

U.S. PATENT DOCUMENTS

| 4,859,958 | 8/1989 | Myers | 329/112 |
|---|---|---|---|
| 4,992,747 | 2/1991 | Myers | 329/316 |
| 5,038,115 | 8/1991 | Myers et al. | 331/2 |
| 5,280,472 | * 1/1994 | Gilhousen et al. | 370/320 |
| 5,329,242 | 7/1994 | Myers | 329/300 |
| 5,416,797 | * 5/1995 | Gilhousen et al. | 370/320 |
| 5,943,361 | * 8/1999 | Gilhoousen et al. | 370/320 |

* cited by examiner

Primary Examiner—Dang Ton
(74) Attorney, Agent, or Firm—Patrick T. King

(57) ABSTRACT

A method and apparatus for simultaneously communicating a first data stream along with a second data stream. A first carrier is modulated with a first data stream and a feature of the modulated first carrier is then imposed under the control of a second independent data stream. The modulated first carrier with the imposed feature is then demodulated to provide the first data stream. The distinguishable feature of the modulated first carrier is then detected to provide the second data stream. The first and the second data streams are clocked at rates which are integer multiples of each other. The distinguishable feature of the modulated first carrier includes the amplitude of the modulated first carrier or the frequency of the modulated first carrier. M-ary information is transmitted by transmitting groups of 3 or more bits simultaneously by using distinguishable amplitude, frequency or time of occurrence values of a feature imposed on a first carrier.

22 Claims, 15 Drawing Sheets

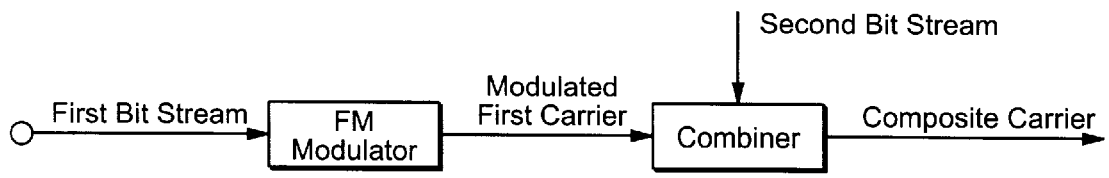
FIG._1
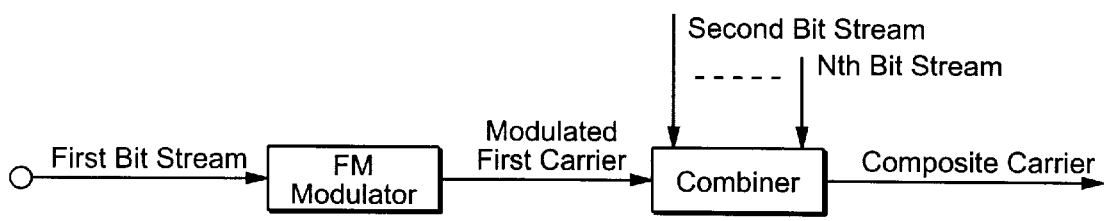
FIG._2
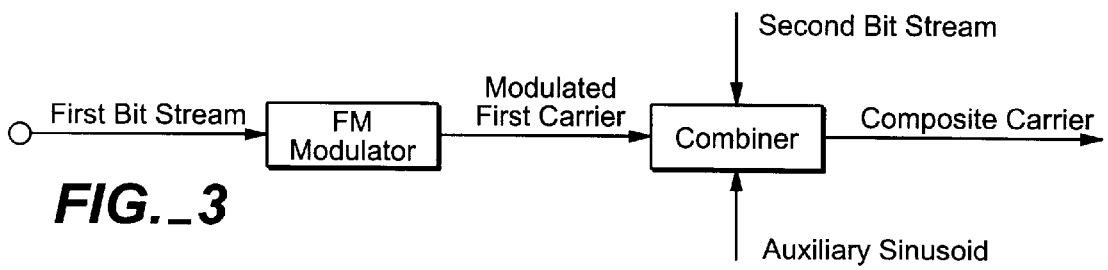
FIG._3
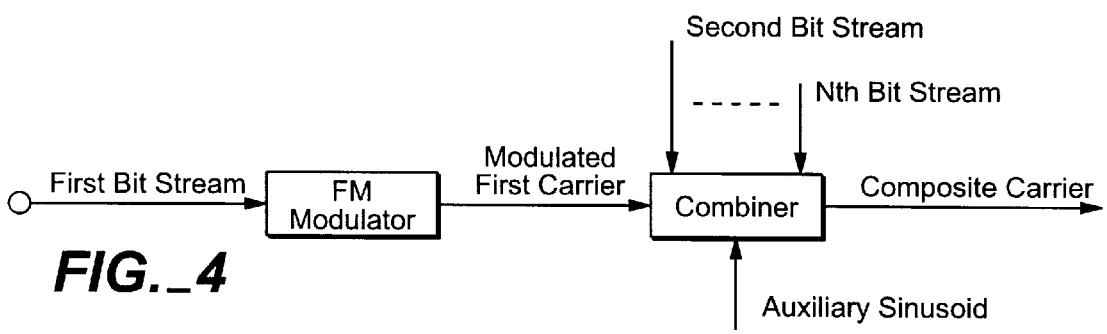
FIG._4

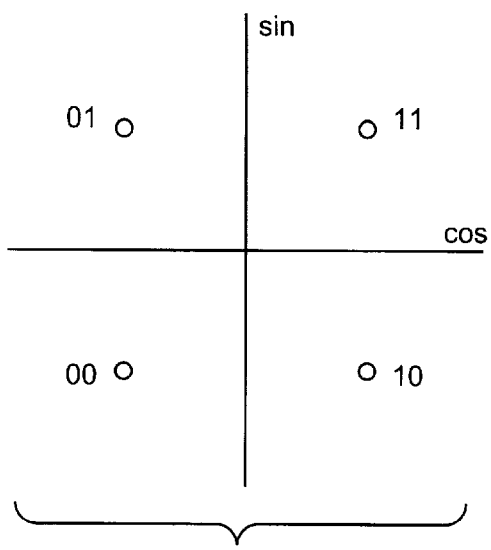
FIG._5
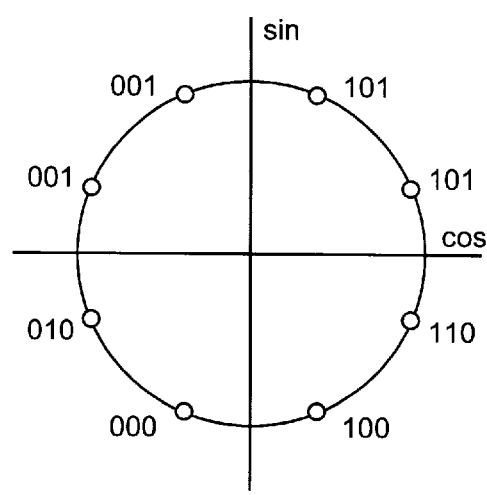
FIG._6
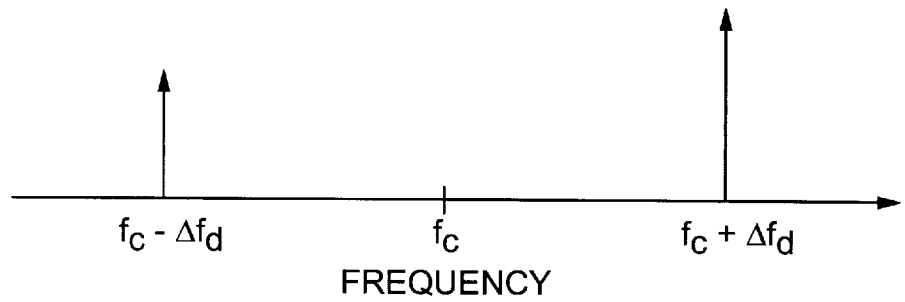
FIG._10
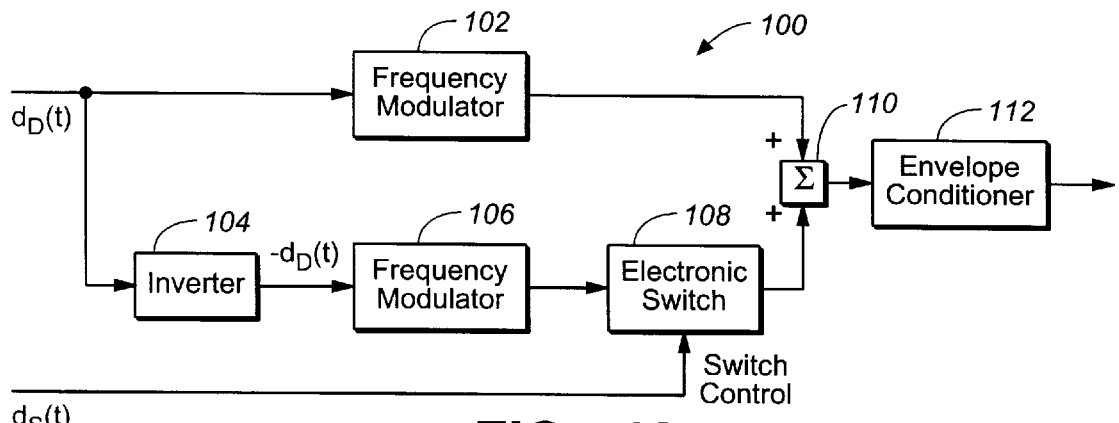
FIG._12

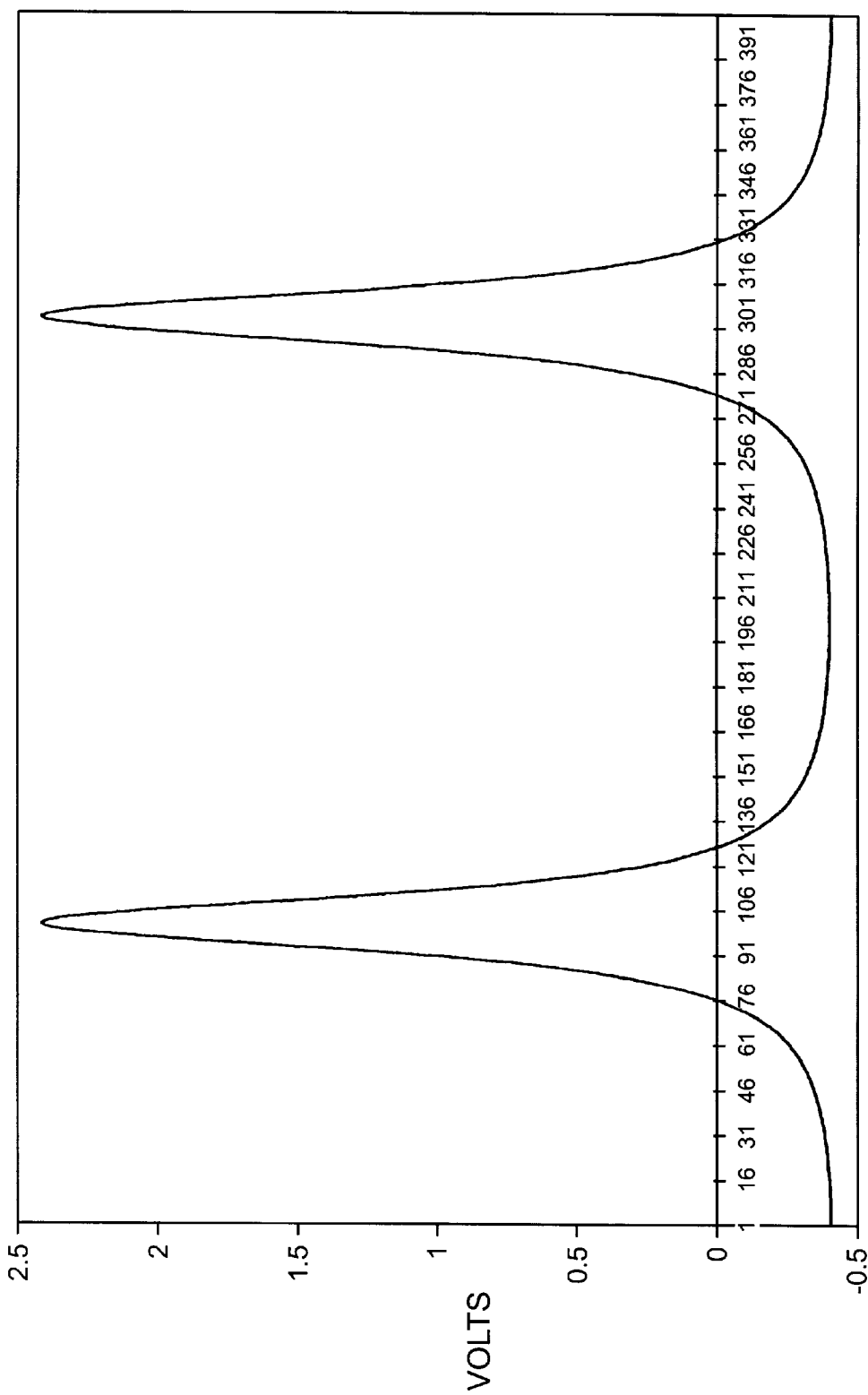
FIG._7

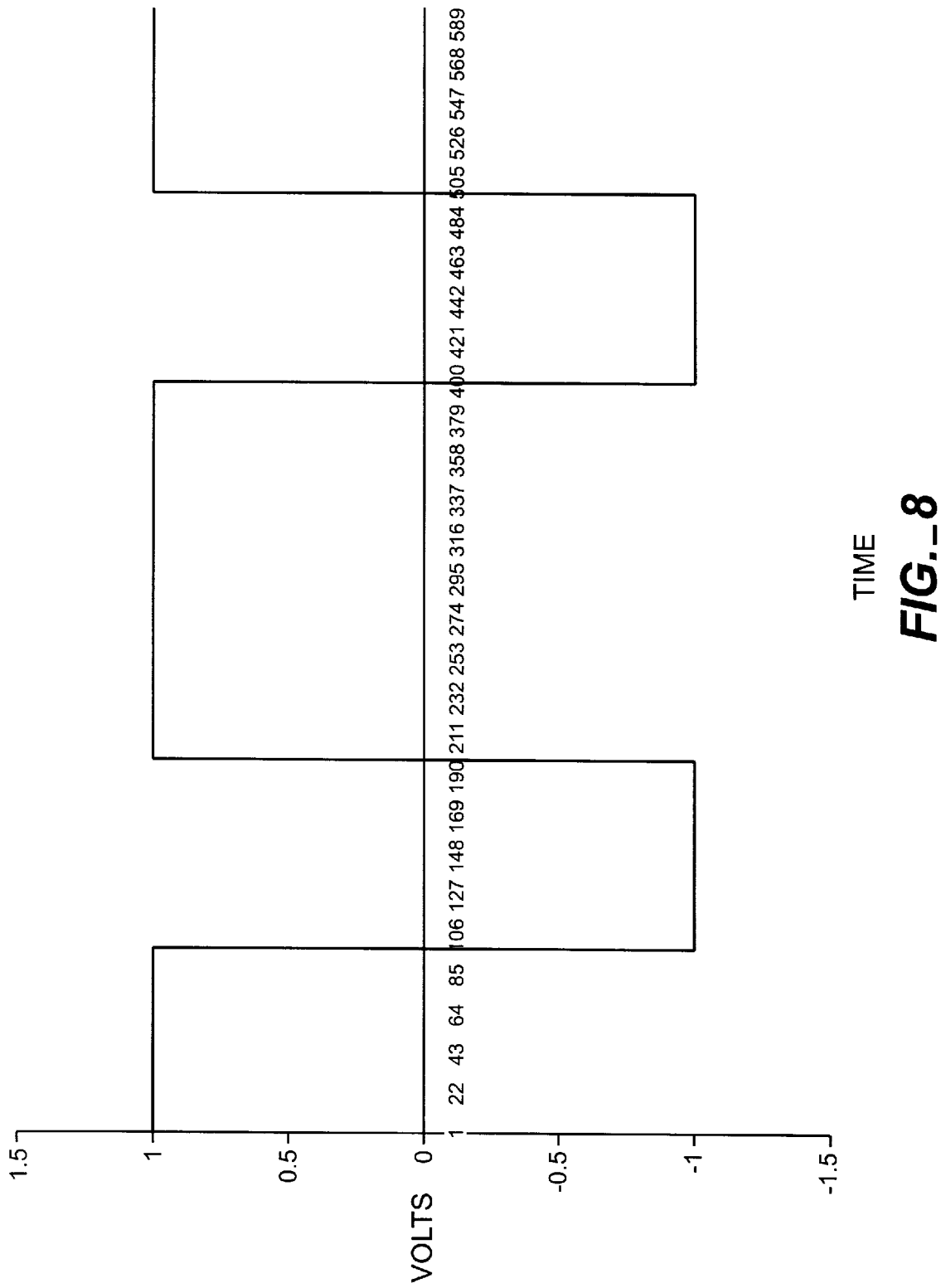

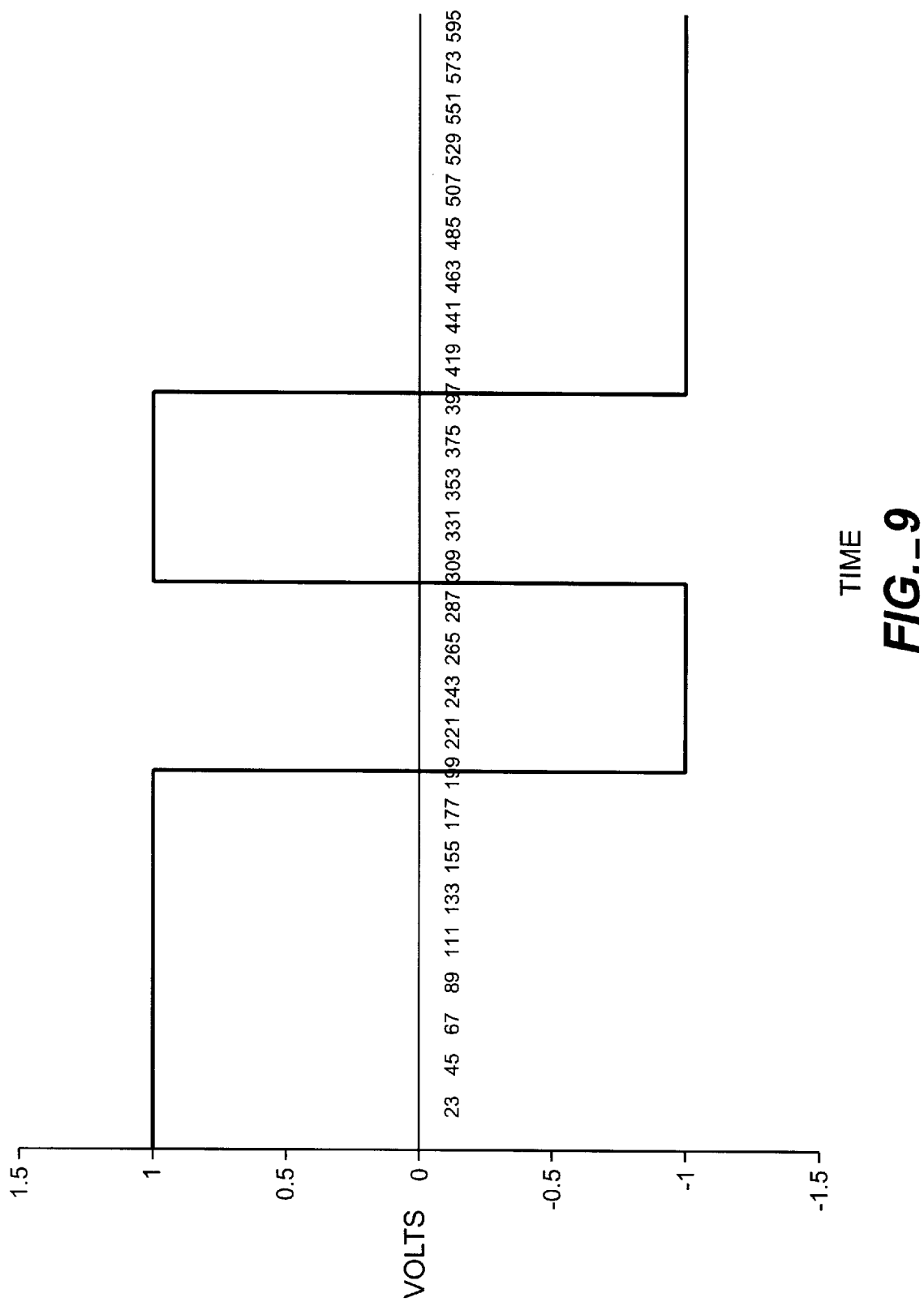
FIG._9

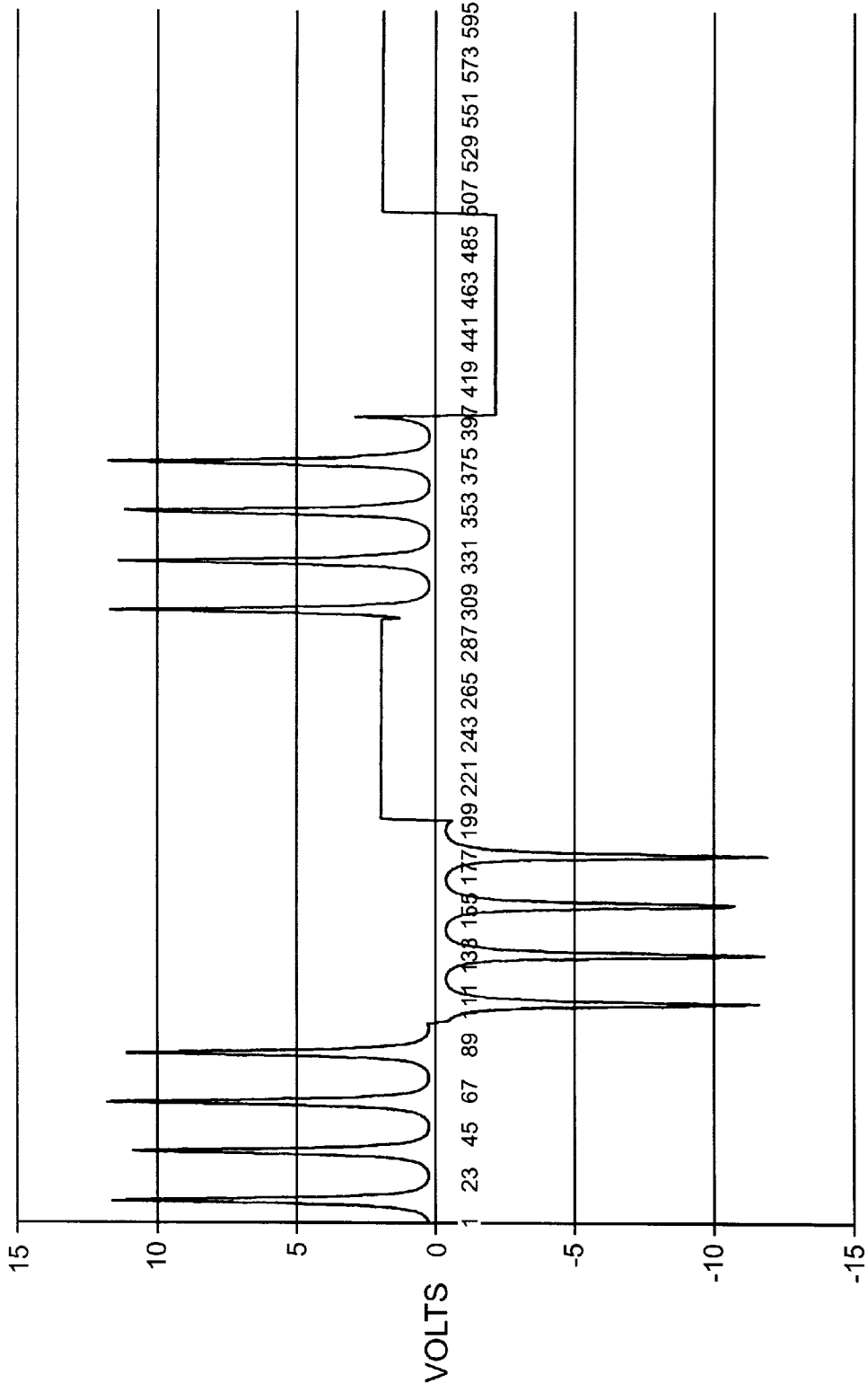
FIG._11

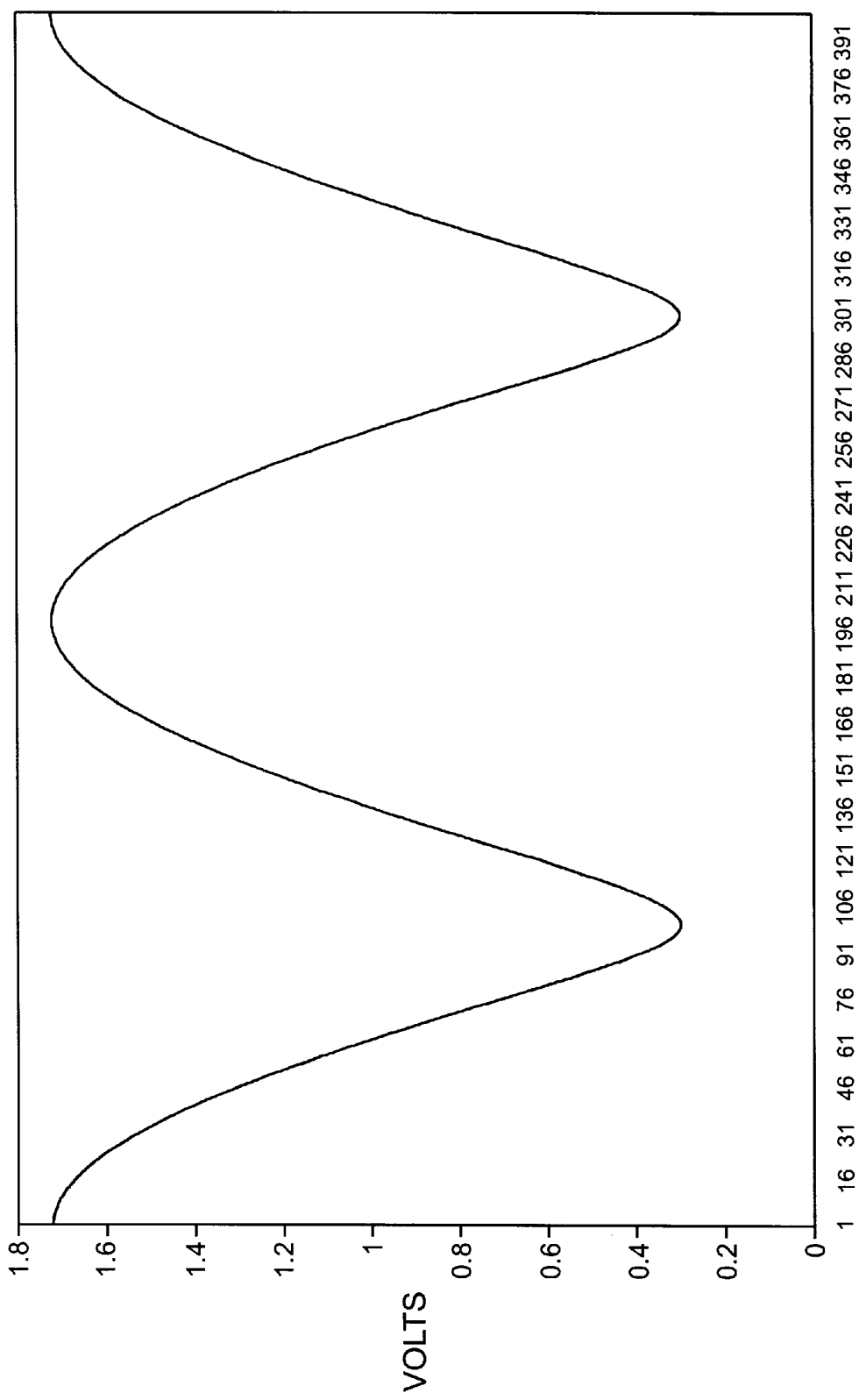
FIG._13

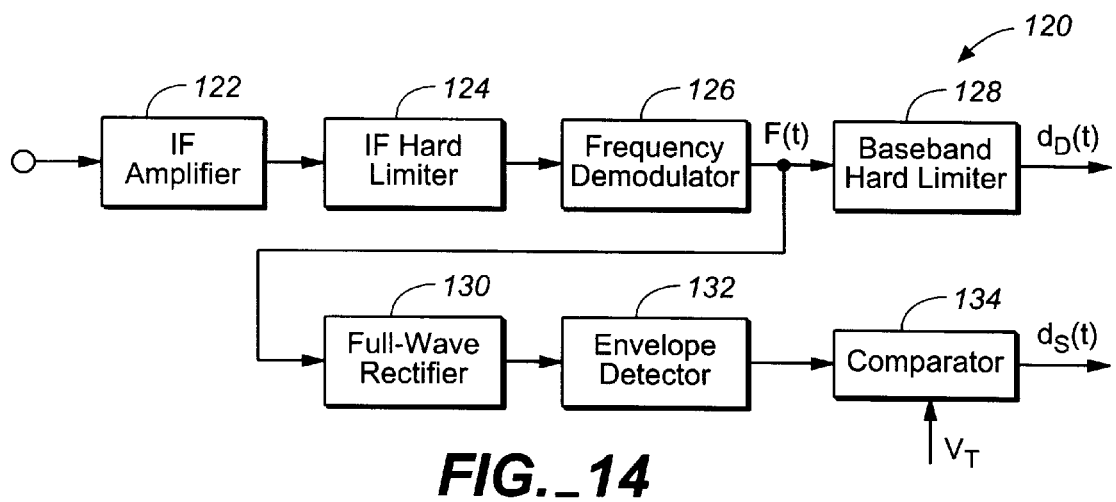
FIG._14
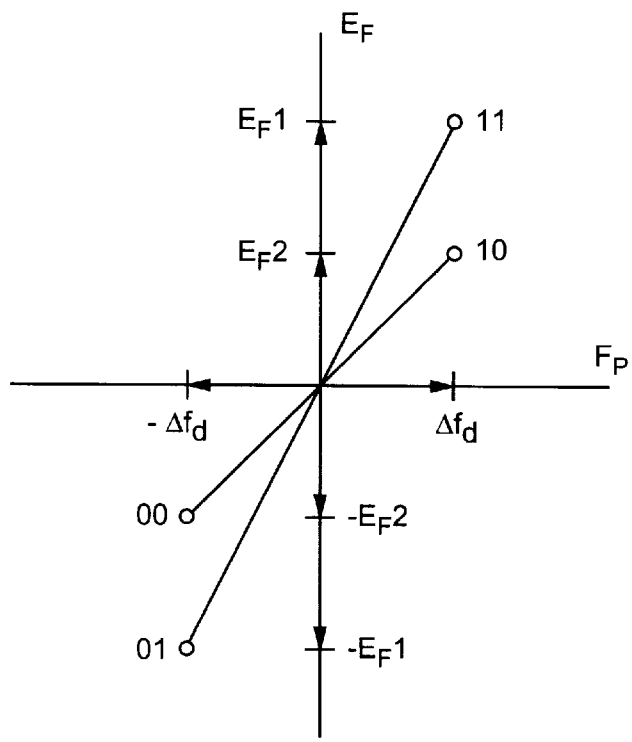
FIG._16

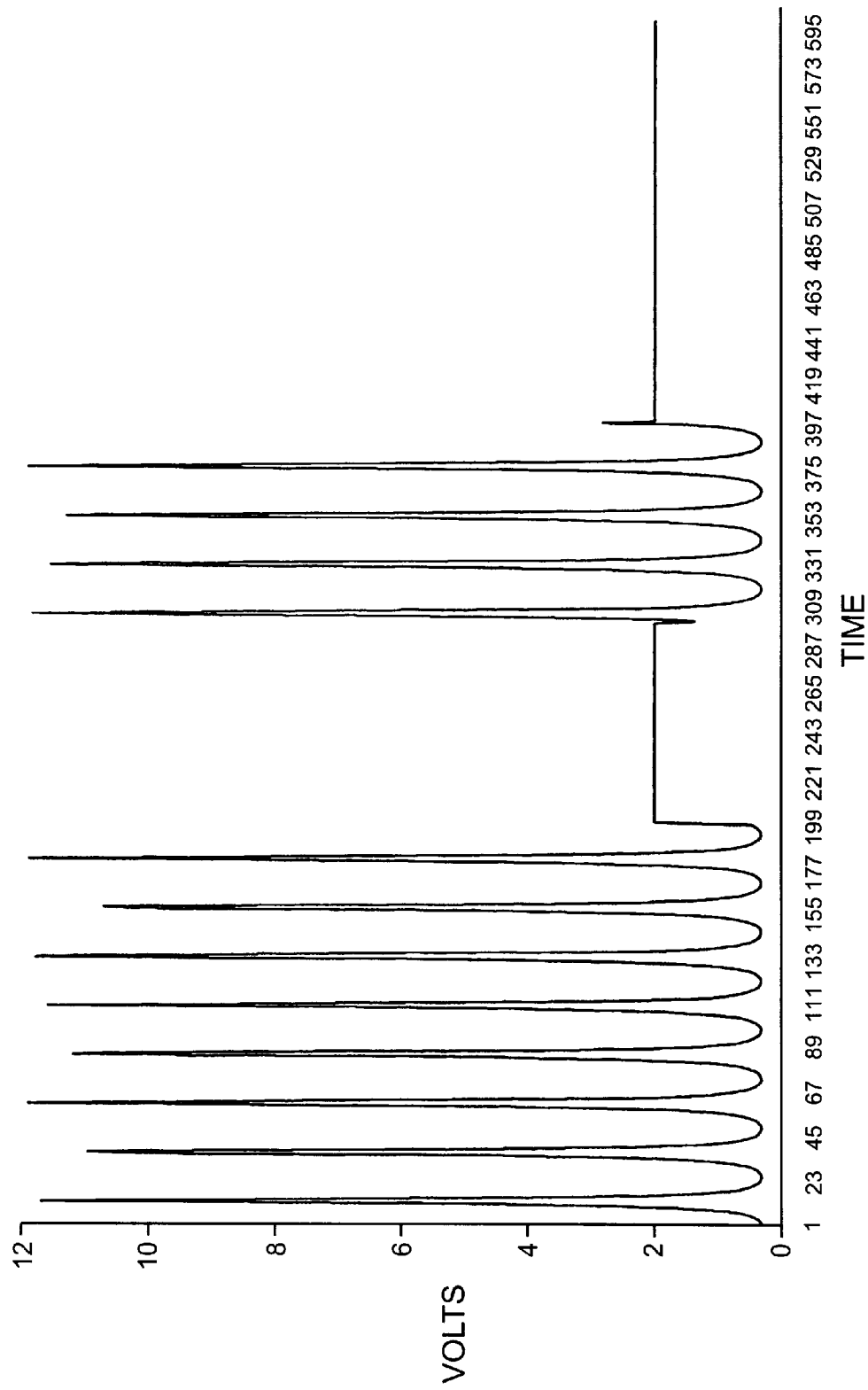
FIG._15

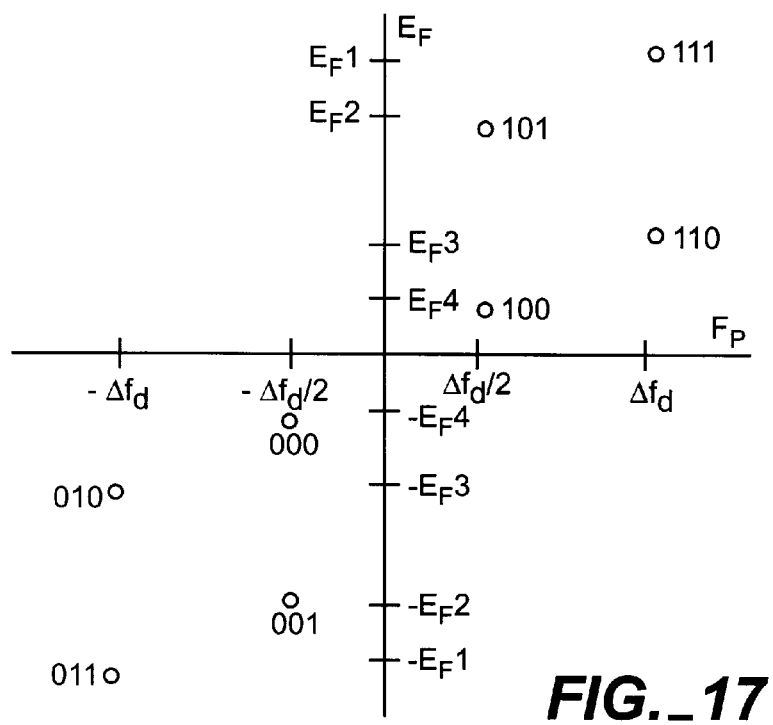
FIG._17
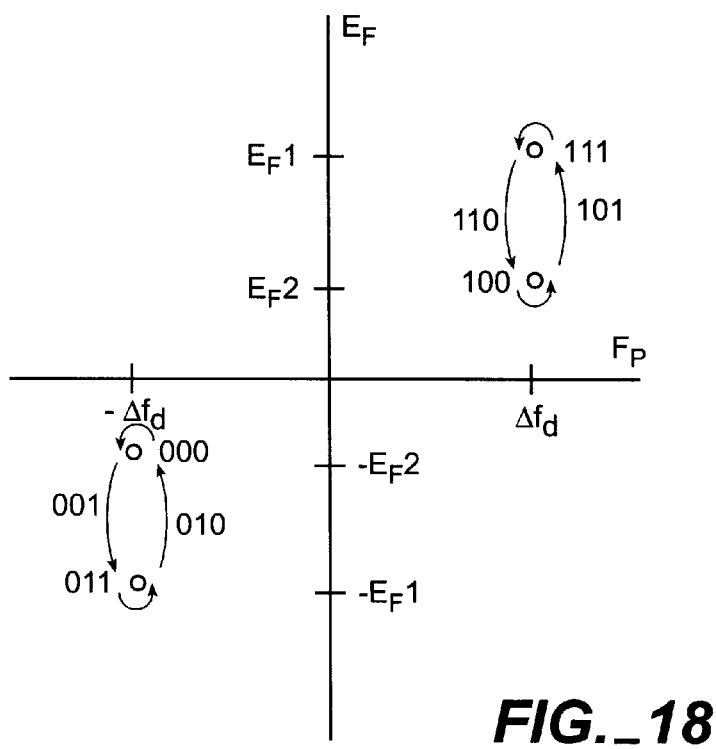
FIG._18

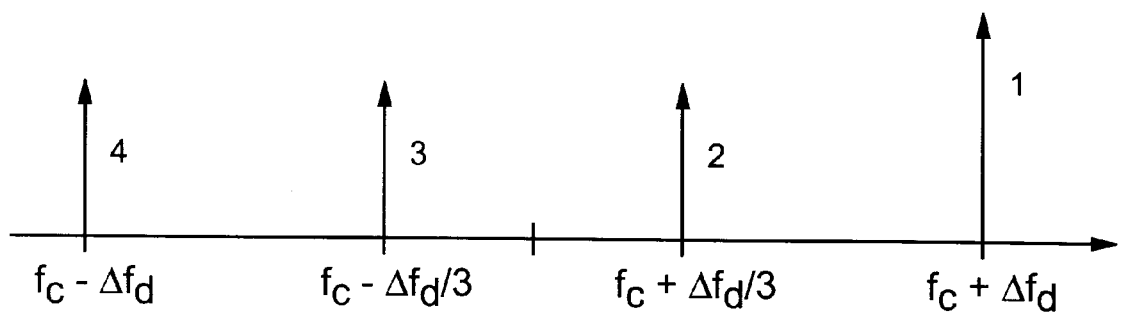
FIG._19
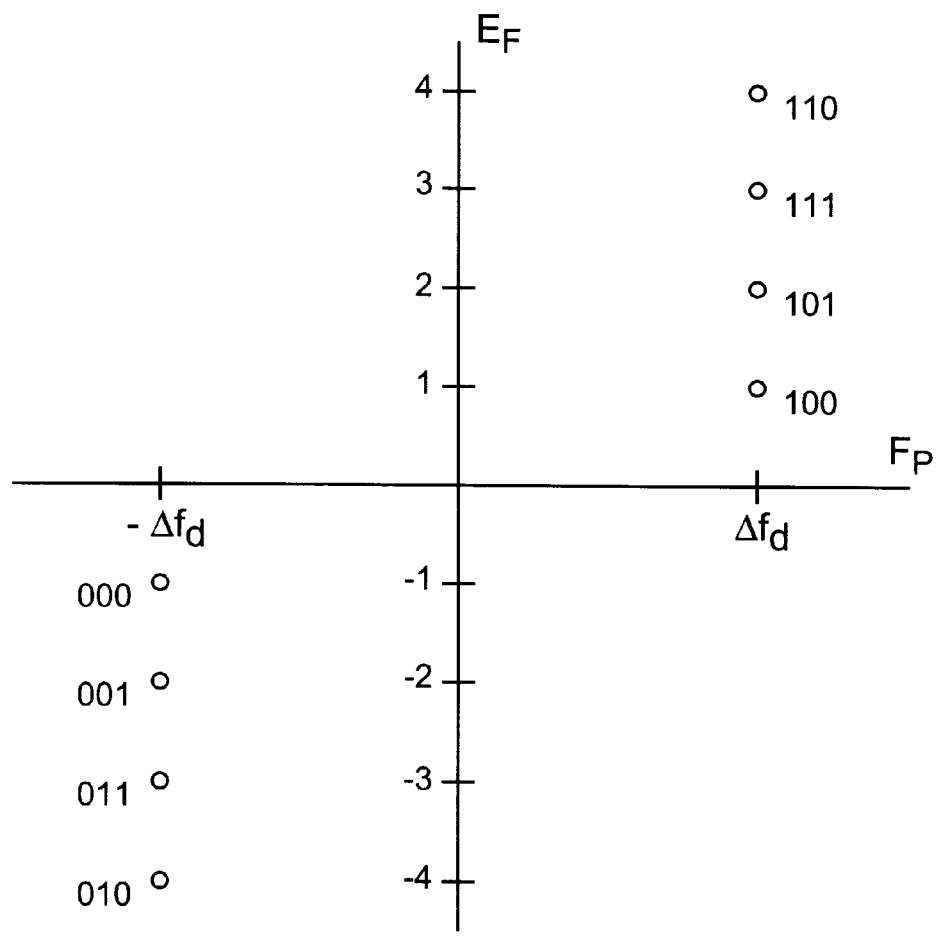
FIG._20

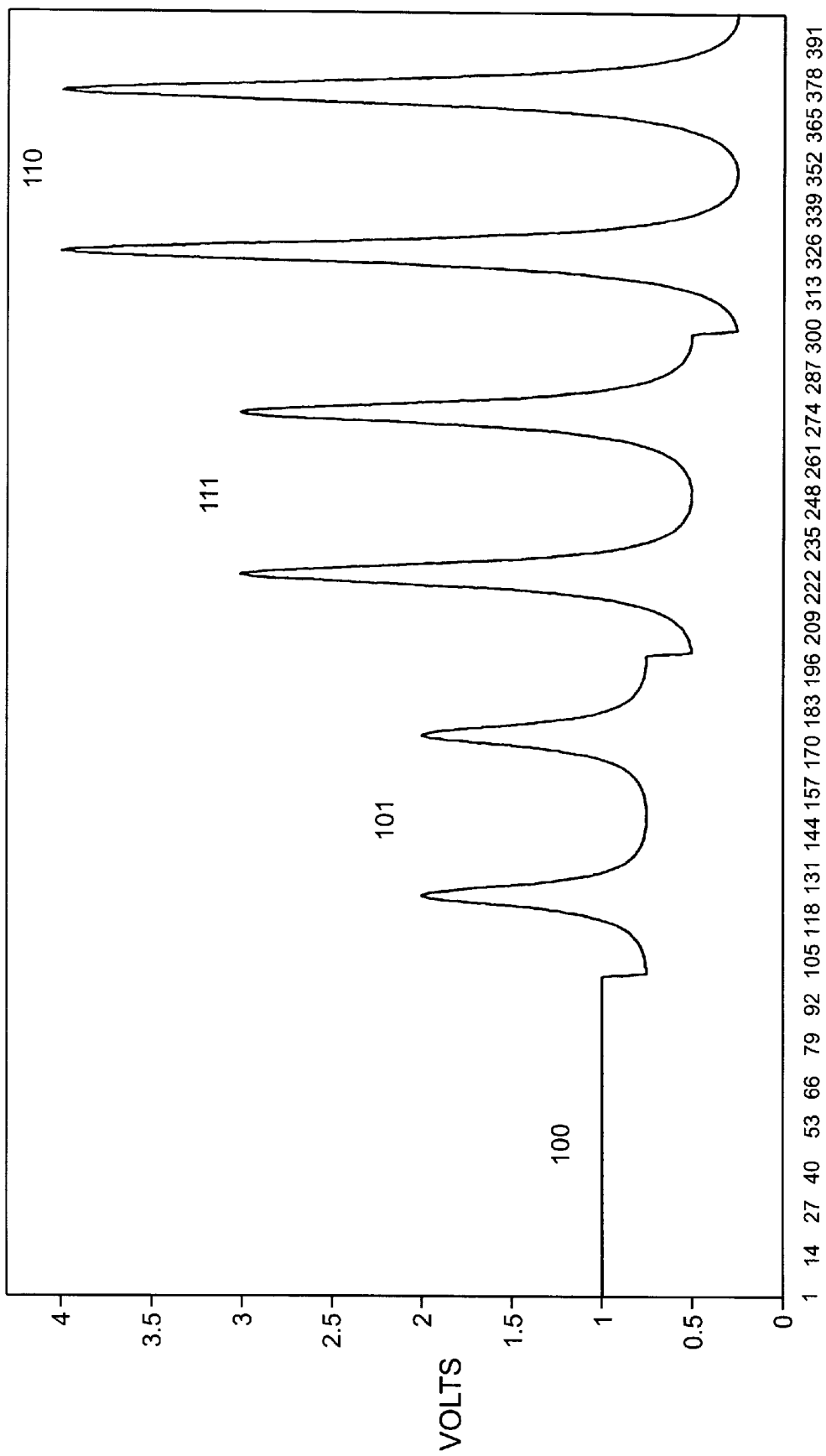
FIG._21

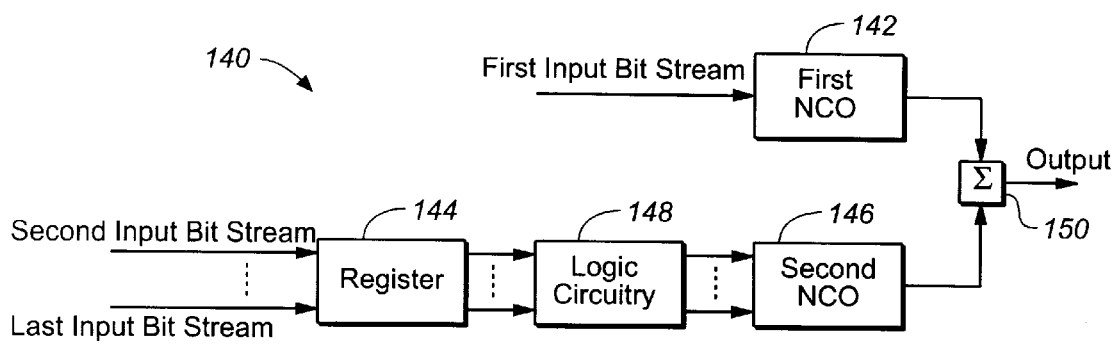
FIG._22
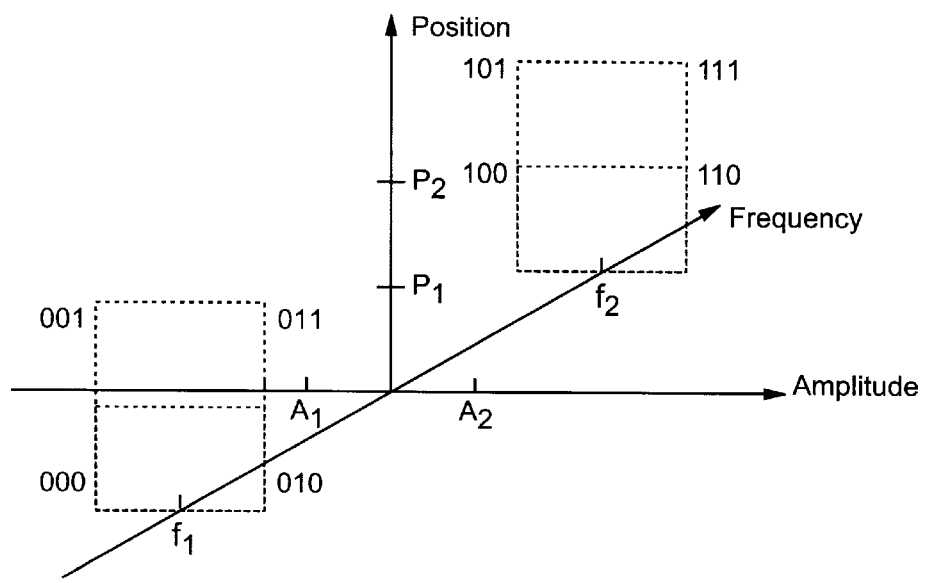
FIG._23

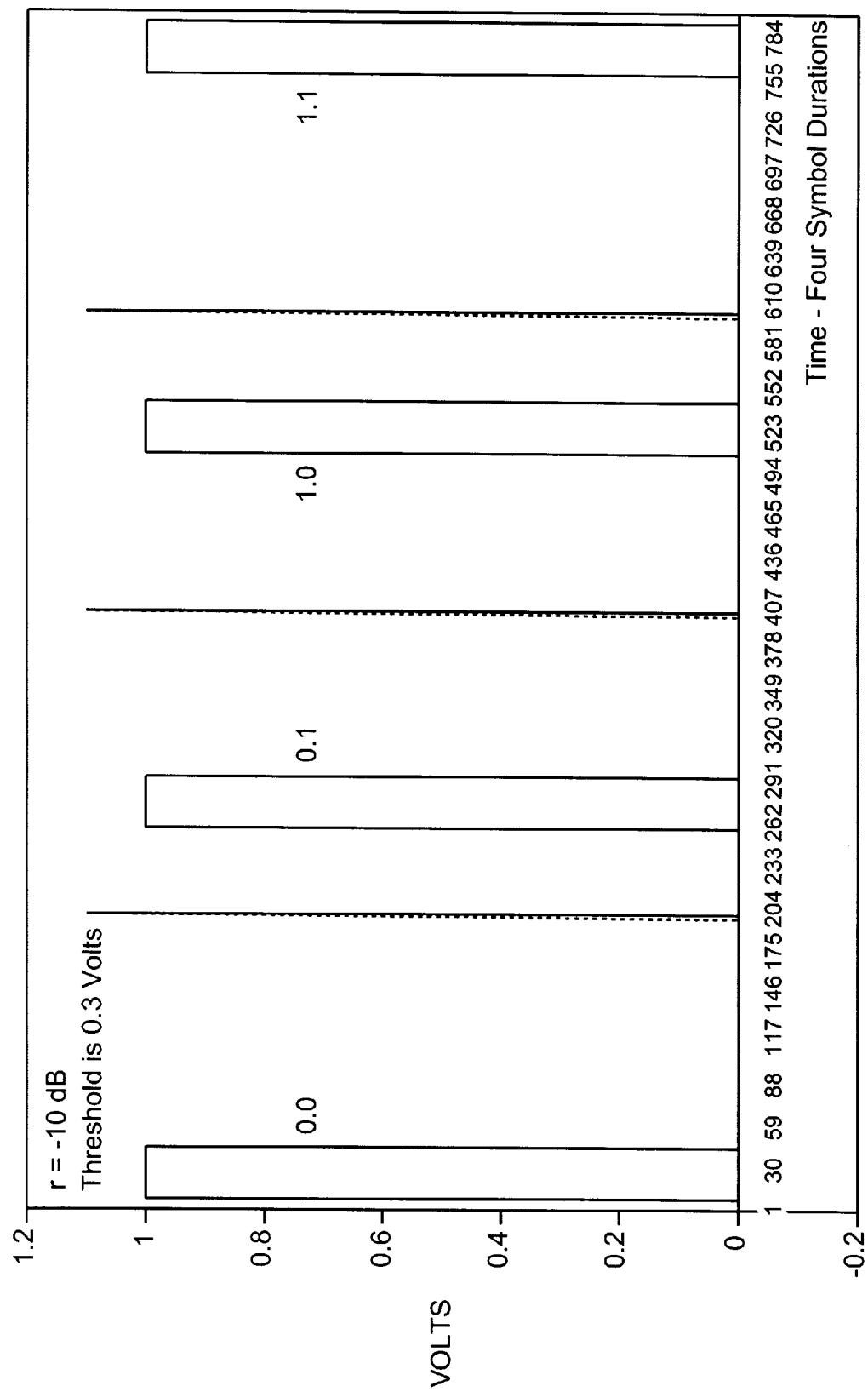
FIG._24

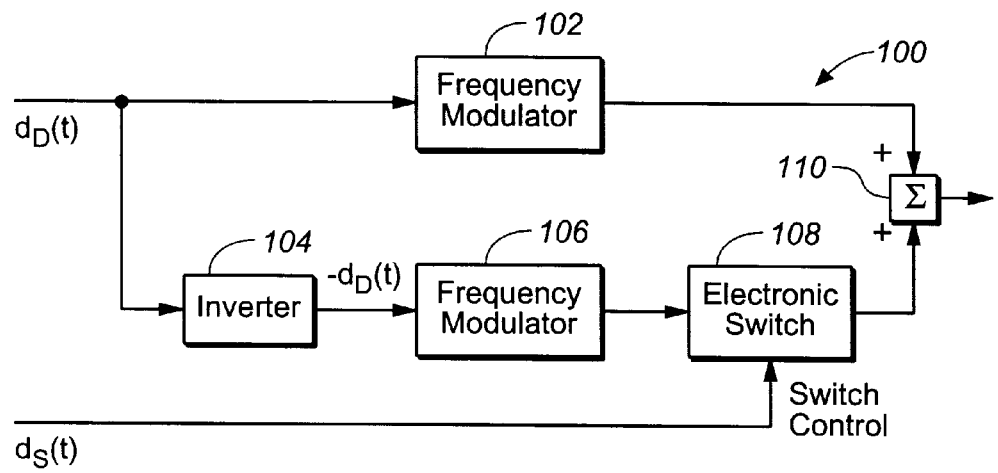
FIG._25A
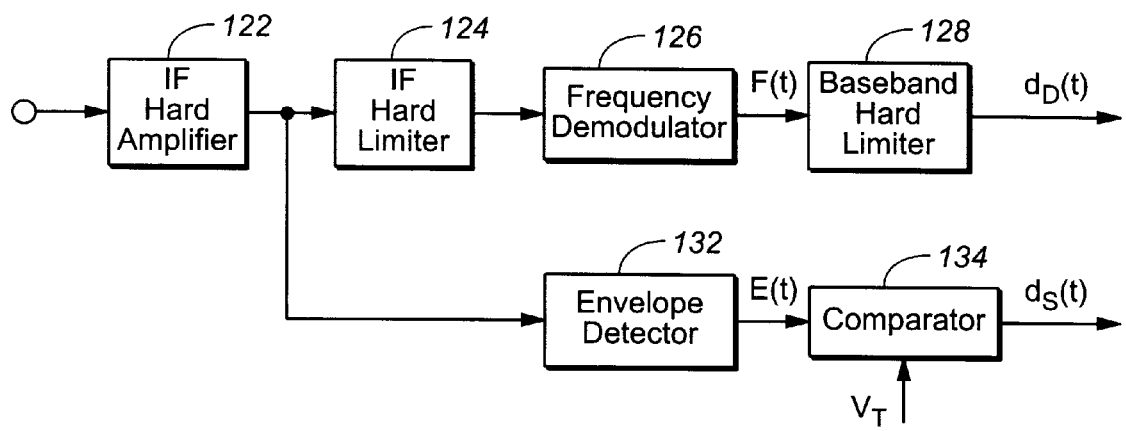
FIG._25B

USE OF FEATURE CHARACTERISTICS INCLUDING TIMES OF OCCURRENCE TO REPRESENT INDEPENDENT BIT STREAMS OR GROUPS OF BITS IN DATA TRANSMISSION SYSTEMS

This patent application is a continuation-in-part of U.S. patent application Ser. No. 08/870,469 filed Jun. 6, 1997.

TECHNICAL FIELD

The present invention generally relates to the transmission of binary digits (bits), and, more particularly, to the use of the presence, absence or values of features of the means of transmission to represent single bits or groups of bits.

BACKGROUND OF THE INVENTION

Bit streams are used to represent the outputs of microphones, cameras, and a variety of other transducers. Bit streams are the input and output forms of computers. When the origin of the message of interest is distant from the user, then a means of transporting the bit streams is required. Commonly, this means is optical or electromagnetic. The means can be guided (fibers, cables, pairs of wire), or it can be unguided (radiation). Radiation makes use of carriers consisting of sinusoidal waves. Modulation of the sinusoidal carrier enables the transmission of the bit stream(s).

A simple form of a feature of a modulated carrier is its presence. That is, in a simple case, the presence of a sinusoid or the presence of optical energy (light) represents a binary 1, for example. The absence of these represents a binary 0. This is a standard means of transmitting bit streams over glass fibers and of recovering bit streams from compact disk recordings, for example. In radio communications, this simple form is called on-off amplitude modulation or on-off keying (OOK). In this case, only one bit stream is sent per carrier.

The amplitude, frequency or phase and combinations thereof of a sinusoidal carrier can be modulated to distinguish one bit from the other or a group of bits from another group. A variety of well known modulation schemes are treated in the literature. Types of modulation are characterized by bandwidth efficiency and power efficiency. Bandwidth efficiency relates to the band of frequency spectrum occupied by the modulated carrier for a given rate of bit transmission (bit rate in bits per second). Power efficiency relates to the probability of any bit received in error, or bit error ratio (BER), as a function of receiver input signal to noise ratio (SNR).

Conventional means of bit stream transmission do not consider use of multiple co-channel carriers to transmit one or more bit streams simultaneously. In this manner, spectrum can be reused thereby improving bandwidth efficiency. Modification of a bit by the inclusion of a recognizable feature is not treated as a means of increasing data throughput within a prescribed band of frequency. Theoretical comparisons of the types of carrier modulation rarely consider the complexity of the transmitter circuitry needed to generate and radiate the modulated carrier and the receiver circuitry required to recover the bit stream from the carrier. Therefore, because of the cost and availability of spectrum, and because of the cost associated with complexity with a small number of units, there is a need to define and develop data transmission systems which are simple, robust and bandwidth efficient.

U.S. Pat. Nos. 4,859,958 and 4,992,747, invented by Glen A. Myers, the inventor of the present invention, are each incorporated by reference in the present application as though fully set forth herein. In these patents, a means for demodulating all of several co-channel FM carriers is described.

U.S. Pat. No. 5,038,115, co-invented by the inventor of the present invention, is also incorporated by reference in the present application as though fully set forth herein. In this patent, phase tracking of input terminal signals is described. In one embodiment of the phase tracking circuit of U.S. Pat. No. 5,038,115, a phase tracking circuit makes use of two phase-locked loops electrically connected in a feed forward manner.

U.S. Pat. No. 5,329,242 invented by the inventor of the present invention, is also incorporated by reference as though fully set forth herein. In this patent, demodulating a frequency modulated signal using the time intervals between zero crossings of a received carrier signal is described. Averaging and mapping techniques are used to improve estimates of the message signal.

U.S. Pat. Nos. 5,541,959 and 5,570,395, invented by the inventor of the present invention, are also incorporated by reference as though fully set forth herein. These patents describe, analytically and geometrically, the effect of adding two sinusoids of different frequency.

U.S. Pat. No. 5,606,581, invented by the inventor of the present invention is also incorporated by reference as though fully set forth herein. This application described a method and apparatus for creating a replica of a dominant carrier.

U.S. Pat. No. 5,554,955, invented by the inventor of the present invention, is also incorporated by reference as though fully set forth herein. This patent describes method and apparatus for removing the effects of co-channel interference from the message on a dominant frequency modulated carrier and for recovering the message from each of two co-channel carriers.

U.S. patent application Ser. No. 08/705,721, now U.S. Pat. No. 5,878,084, invented by the inventor of the present invention is also incorporated by reference as though fully set forth herein. This application describes method and apparatus for recovering the independent bit streams from each of two co-channel frequency modulated carriers.

U.S. patent application Ser. No. 08/870,469 by the inventor of the present invention is also incorporated by reference as though fully set forth herein. This application describes method and apparatus for transferring two or more independent bit streams using each of two co-channel frequency modulated carriers.

SUMMARY OF THE INVENTION

The present invention relates to method and apparatus for creation and use of a feature of a modulated carrier to represent a bit or a group of bits. The presence of the feature represents one of the two possible binary digits and the absence of the feature represents the other binary digit.

This invention considers the addition of a feature to an existing bit stream representation to permit the transmission of other bit streams whose binary digits are recognized by distinguishable features imposed on the first bit stream. The presence or absence of a feature imposed on a bit stream allows the simultaneous transmission of a second independent bit stream.

For example, consider an optical transmission means whereby a carrier of one color (blue) represents a binary one and that of another color (green) a binary zero. Transmit a second independent bit stream by shifting these colors slightly when the bit of the second stream is one digit and no shift for the other digit. When detected in the receiver, the original and slightly shifted colors are distinguished to recover the first bit stream. The shift or absence of the shift in colors when detected provides the second bit stream. Simplest operation in this manner occurs when the two bit streams are clocked at the same rate or at rates which are integer multiples of each other.

Accommodating two independent bit streams in this manner is equivalent to sending two bits simultaneously as a group from one bit stream. This reduces the switching rate of the carrier which translates to a reduction in required bandwidth or occupied spectrum.

Using additional available parameters of the carrier (intensity in the optics example) along with a range of possible values of each parameter permits the accommodation of several independent bit streams sent simultaneously on a single carrier. Alternatively, the grouping of several bits of one or more streams can be sent at once using a single carrier. These parameters include amplitude, width or duration, rate of occurrence, and time of occurrence of a feature.

In accordance with a preferred embodiment of the present invention, use is made of the appropriate addition of a second co-channel carrier to generate the feature of interest. This is particularly attractive in radio communications where bandwidth efficient transmission means are important. By judicious choice of the amplitude separation, frequency separation and relative phase of the two carriers, many differing and distinguishable feature voltages can be generated by design. This method of constructing features results in simple transmitter circuitry and simple receiver circuitry as well as simple and flexible communications as compared with other systems.

The present invention provides a method of simultaneously communicating a first data stream along with a second data stream. The invention includes the steps of: modulating a first carrier with a first data stream to provide a modulated first carrier; imposing a feature on the modulated first carrier to provide a distinguishable feature of the modulated first carrier which represents a second data stream; transmitting the modulated first carrier with the distinguishable feature through a transmission medium. The method further includes the steps of: receiving the transmitted modulated first carrier with the distinguishable feature to provide a received modulated first carrier with the feature; demodulating the received modulated first carrier with the distinguishable feature to provide the first data stream; and detecting the distinguishable feature of the received modulated first carrier to provide the second data stream.

The first and the second data streams are clocked at rates which are integer multiples of each other.

The invention further includes the step of simultaneously transmitting M-ary information by transmitting groups of 2 or more bits simultaneously wherein each group of 2 or more bits defines a symbol and wherein the number of distinct symbols equals $2^n$ where n is the number of bits in a group.

The invention further includes a system and a method for transmitting and receiving independent bit streams from a composite modulated carrier. The transmitter includes a first system input terminal for receiving a first input bit stream and coupled to a first frequency modulator such as a numerically controlled oscillator which receives the first input bit stream which has an output terminal where a first sinusoidal signal of known initial phase is provided. The sinusoidal signal is frequency modulated by the first input bit stream.

The transmitter also includes a summer having a first and second input terminal and an output terminal wherein the output terminal of the first frequency modulator is coupled to the first input terminal of the summer. Other system input terminals receive the remaining input bit streams which define the symbol to be transmitted. A data register has output terminals and input terminals coupled to the other system input terminals. The transmitter also includes logic circuitry having output terminals and input terminals coupled to the data register output terminals. A second frequency modulator such as a numerically controlled oscillator is provided with input terminals which are coupled to the logic circuitry output terminals. An output terminal of the logic circuits provides a second sinusoidal signal having values of initial phase and amplitude determined by the contents of the data register. The sinusoidal signal is frequency modulated by the output of the logic circuitry. The output terminal of the second frequency modulator is coupled to the second input terminal of the summer and the output signal of the summer is a composite carrier which is transmitted and the power of the first sinusoidal signal is greater than the power of the second sinusoidal signal.

The receiver includes an RF or IF amplifier having an output terminal at which is provided a replica of the transmitted composite carrier. A frequency demodulator has an input terminal for receiving the output of the RF or IF amplifier and has an output terminal at which is provided a frequency-demodulated signal which is comprised of the bit stream on the stronger carrier on which are superimposed voltage spikes which have characteristics which include amplitude, position and rate characteristics. The receiver also includes a limiter having an input terminal coupled to the output terminal of the frequency demodulator which includes an output terminal at which is provided an output signal corresponding to the first input bit stream. A detector has an input terminal coupled to the output terminal of the frequency demodulator for receiving the superimposed voltage spikes and measuring the peak values, position and/or rate of the voltage spikes. The detector has output terminals at which are provided the remaining bit streams wherein the independent bit streams are recovered from a single composite transmitted carrier.

Another embodiment of a receiver uses an envelope detector having an input terminal for receiving a replica of the output signal of the summer; the envelope detector having an output terminal at which is provided an amplitude-demodulated signal which indicates the state of the second input bit stream. A comparator having a second input terminal coupled to the output terminal of the envelope detector, said comparator having an output terminal at which is provided an output signal corresponding to the second input bit stream. In this second manner, the two independent bit streams are recovered from a single composite power multiplexed sinusoidal carrier.

The transmitter may include an envelope conditioner. The spike characteristic detector is a peak voltage detector for the voltage spikes of the frequency-demodulated signal. The peak voltage detector includes a full-wave rectifier having an analog voltage multiplier having one input terminal coupled to the output terminal of the frequency demodulator and having another input terminal coupled to the output terminal of the limiter, said analog voltage multiplier having an output terminal. The spike characteristic detector can also be a rate detector for the voltage spikes of the frequency-demodulated signal. The input bit streams are clocked from a common timing reference signal in the transmitter.

A second embodiment of the method includes amplitude demodulating a replica of the combined transmitter signal to provide an amplitude-demodulated signal, wherein the amplitude-demodulated signal indicates the state of the second input bit stream; comparing the amplitude-demodulated signal levels to a reference signal in a comparator to provide an output signal corresponding to the second input bit stream; the first input bit stream is recovered in the manner of the first embodiment of the method; wherein the two independent bit streams are recovered from a single composite sinusoidal carrier.

Several bit streams can be transmitted simultaneously by using the sum of a modulated first carrier and a modulated second carrier to create distinguishable characteristics of a feature. Variables which can be controlled by the bits of the several streams include the values of amplitude, frequency and initial phase of each of the first and second modulated carriers. In this manner, M-ary digital communications for M=8, 16, 32, etc. can be provided.

Another embodiment of the method uses numerically controlled oscillators (NCO) as frequency modulators. With the use of NCOs the time of occurrence of a feature can be used to transmit a second and other bit streams. NCOs allow precise determination of frequency and phase of a first carrier and of a second carrier. When combined these carriers create features having multiple values such as precise times of occurrence.

The invention also provides a method of simultaneously providing in the same frequency band a first data stream along with other independent data streams. This method includes the steps of modulating a first carrier with a first data stream to provide a modulated first carrier and imposing a distinguishable feature on the modulated first carrier to provide distinguishable values of a feature, which distinguishable values of the feature represent at least one other independent data stream, wherein the distinguishable feature includes times of occurrence.

The invention also provides method of simultaneously providing in the same frequency band a first data stream along with other independent data streams. This method includes modulating a first carrier with a first data stream to provide a modulated first carrier and using an auxiliary sinusoid to provide a distinguishable feature imposed on the modulated first carrier to provide distinguishable values of the feature of the modulated first carrier, which distinguishable values of the feature represent at least one other independent data stream, wherein the distinguishable feature includes time of occurrence.

The invention also provides a data communication system for simultaneously communicating independent first and other data streams. The data communication system includes a modulator for modulating a first carrier with a first data stream to provide a modulated first carrier and means for imposing distinguishable values of a feature on the modulated first carrier to represent at least one other data stream, wherein said distinguishable values include time of occurrence.

BRIEF DESCRIPTION OF THE DRAWINGS

The accompanying drawings which are incorporated in and form a part of this specification, illustrate embodiments of the invention and, together with the description, serve to explain the principles of the invention.

FIG. 1 is a block diagram of a transmitting system for the case of two bit streams.

FIG. 2 is a block diagram of a transmitting system for the case of n bit streams.

FIG. 3 is a block diagram of a particular transmitting system that uses an auxiliary sinusoid to create a feature for the case of two bit streams.

FIG. 4 is a block diagram of a particular transmitting system that uses an auxiliary sinusoid to create a feature for the case of n bit streams.

FIG. 5 is an example of a 4-ary signal constellation.

FIG. 6 is an example of an 8-ary signal constellation.

FIG. 7 is an illustrative example of a feature generating function.

FIG. 8 is an example of an illustrative input bit stream $d_d(t)$ to the transmitter.

FIG. 9 is an example of another illustrative input stream $d_s(t)$ to the transmitter.

FIG. 10 is an example of the values of the peak frequency deviation of the dominant carrier and the subdominant carrier.

FIG. 11 is an illustrative example of the signal output F(t) of any type of frequency demodulator for the illustrative bit streams of FIGS. 8 and 9.

FIG. 12 is a block diagram of a transmitter according to the invention.

FIG. 13 is an example of the values of the envelope E(t).

FIG. 14 is a block diagram of a receiver having a spike peak-voltage feature detector according to the invention.

FIG. 15 is an illustrative example of the signal output of a full-wave rectifier having as input the output of the frequency demodulator of FIG. 14.

FIG. 16 is an illustrative example of a 4-ary voltage constellation

FIG. 17 is an illustrative example of an 8-ary voltage constellation showing transitions when one bit stream is clocked at twice the rate of the other.

FIG. 18 is an illustrative example of an 8-ary voltage constellation identifying the symbols representing a group of three bits of a single bit stream or one bit each of three bit streams.

FIG. 19 is a graph indicating possible values of frequency of the dominant carrier and the three subdominant carriers.

FIG. 20 is an example of a constellation of an 8-ary system for the combination of a dominant carrier with another one of three subdominant carriers of differing frequency.

FIG. 21 is a graph of F(t) for the combination of a dominant carrier with another one of three possible subdominant carriers of differing frequency.

FIG. 22 is a block diagram of a transmitter used to transfer multiple bit streams using NCOs.

FIG. 23 is an illustrative example of a three-dimensional voltage constellation.

FIG. 24 is a graph of four possible positions within a bit of the peak value of the voltage spike.

FIG. 25A is a block diagram of a transmitter for a system which uses an envelope as a feature.

FIG. 25B is a block diagram of a receiver having an envelope feature detector.

DETAILED DESCRIPTION OF THE PREFERRED EMBODIMENT

This invention considers use of features of a single, composite modulated carrier to transmit two bit streams simultaneously, or, in general, to transmit groups of 2, 3 or more bits simultaneously. This grouping of bits defines symbols. A group of two bits results in four possible combinations of bits. These are 00, 01, 10 and 11. A group of three bits results in 8 possible combinations or symbols, etc. When the bits are grouped to define symbols prior to transmission, then the process in called M-ary communications where M is the number of possible symbols to be sent. Therefore, there are binary, 4-ary, 8-ary, 16-ary, etc. communication systems.

FIG. 1 is a block diagram of a transmitting system whereby a first bit stream frequency modulates a first carrier. A second bit stream effects the combining of the first modulated carrier with a suitable voltage to create a composite carrier which carries the first bit stream and possesses a feature whose presence or absence represents the second bit stream.

As shown in FIG. 2, in the case of n bit streams, the first bit stream frequency modulates a first carrier. The remaining bit streams together effect the combining of the first modulated carrier with one of several suitable voltages to create a composite carrier which carries the first bit stream and possesses one of several possible features whose distinction indicates the state of the remaining bit streams.

FIG. 3 is a block diagram of a particular realization of the system of FIG. 1 whereby an auxiliary sinusoid is used as a suitable voltage to create a composite carrier.

FIG. 4 is a block diagram of a particular realization of FIG. 2 whereby an auxiliary sinusoid having a range of possible values of amplitude, frequency and phase is used as a suitable voltage added to the first modulated carrier to create a composite carrier.

Conventional M-ary systems include M-ary PSK (phase shift keying) which are special cases of quadrature amplitude modulation (QAM). QAM uses two carriers of the same frequency and separated 90 degrees in phase (sine and cosine carriers). Each carrier is then modulated in amplitude. The two carriers are added to generate a composite carrier whose phase and amplitude combinations number m=the number of symbols which must be distinguished in the receiver.

FIG. 5 is a planar representation of 4-ary PSK. Each of the two carriers has one value of amplitude and two values of phase (0 degrees and 180 degrees). FIG. 6 is such a representation of 8-ary PSK. Note that for the case of 8-ary PSK, each carrier (sine and cosine) has two values of phase (0 and 180 degrees) and two values of amplitude. Because all 8 of the points that represent the composite carrier, which is the sum of the two quadrature carriers, lie on a circle, then the peak amplitude of this composite carrier is constant. Only phase modulation of the transmitted carrier exists in this case. This is but one form of QAM. There are many others. In a more general form of QAM, both the phase and amplitude of the composite carrier varies.

Plots like FIGS. 5 and 6 are called signal constellations. The design of such constellations is part of the creation of M-ary signaling systems.

In U.S. Pat. No. 5,554,955 by the inventor of the present invention, which is incorporated by reference as though fully set forth herein, the inventor of the present invention describes analytically the effect of adding two sinusoids of different frequency. The additive combination is another sinusoid having amplitude and frequency which change with time. The exact relationships for the envelope or peak amplitude variations E(t) and the instantaneous frequency deviation F(t) from the value of carrier frequency are shown to be $$E(t) = A_d \cdot [1 + r^2 + 2r\cos\phi(t)]^{1/2} \quad (1)$$

$$F(t) = k_d \cdot d_d(t) + [k_d \cdot d_d(t) - k_s \cdot d_s(t)][g(r, \phi)] \quad (2)$$

where $r = A_s/A_d$ $A_s$=peak amplitude of the subdominant (weaker) carrier $A_d$=peak amplitude of the dominant (stronger) carrier $\phi(t) = \theta_d(t) - \theta_s(t)$ $\theta_d(t)$=phase variation of the dominant carrier due to its message $\theta_s(t)$=phase variation of the subdominant carrier due to its message $k_d$=a property of a dominant carrier frequency modulator which converts volts to Hz $k_s$=a property of a subdominant carrier frequency modulator which converts volts to Hz $d_d(t) = (1/2\pi)[d\theta_d(t)/dt]$=bit stream message carried by the dominant sinusoid $d_s(t) = (1/2\pi)[d\theta_s(t)/dt]$=bit stream message carried by the subdominant sinusoid $$g(r,\phi) = -\{r \cdot [r + \cos \phi(t)]/[1 + r^2 + 2r \cos \phi(t)]\}. \quad (3)$$

The function $g(r,\phi)$ is plotted as FIG. 7 when r=0.707 (r=−3 dB) and for $\phi$ in the range (0, 4π). This function consists of spikes with cusps between the spikes.

The form of $g(r,\phi)$ can be used as a feature to represent 2, 3 or more bits simultaneously.

As a first example, consider two bit streams represented as two voltage levels. Assume the two streams have the same bit rate and are clocked from a common clock so that the voltage transition times are the same. Of course, there may or may not be a voltage transition at a transition time.

FIG. 8 illustrates a two-level bit stream $d_d(t)$ which is applied by FM to a dominant carrier. FIG. 9 illustrates a second independent two-level bit stream $d_s(t)$ which is carried by the presence of a feature voltage on the bit stream of FIG. 8.

An example of the creation of a feature voltage results by applying the following rule. When $d_s(t)$ represents a binary 1, then add a second (subdominant) carrier to the dominant carrier. This generates a variation of F(t) described by the term involving $g(r,\phi)$ in Equation (2). The carrier frequencies of the two sinusoids are approximately equal at $f_c$ Hz. When the subdominant carrier is added, it has a frequency deviation from the carrier frequency opposite that of the dominant carrier. If the frequency deviation of the dominant carrier is $\pm\Delta f_d$, then the difference in frequency of the two carriers has magnitude equal $2\Delta f_d$ when they coexist. When $d_s(t)$=binary 0, transmit only the FM dominant carrier.

FIG. 10 is an example of the possible frequencies of the two carriers for the case of a binary one of each bit stream where it is assumed a 1 is represented by a positive value of frequency deviation from the carrier frequency. The long arrow indicates the dominant carrier and the short arrow the subdominant carrier. When $d_s(t)$ is a binary zero, then the short arrow is absent in FIG. 10 according to the rule.

Said rule results in a form of F(t) shown in FIG. 11 for the bit streams of FIGS. 8 and 9. The graph of F(t) consists of the bit stream on the dominant carrier plus spikes as suggested by Equations (2) and (3). The function $g(r,\phi)$ is the source of the spikes. The peak voltage value of said spikes is related to r and to $[k_d \cdot d_d(t) - k_s \cdot d_s(t)]$ as given by Equation (2) where $k_d \cdot d_d(t)$ is just $\Delta f_d$. The deviation of the subdominant carrier is $k_s \cdot d_s(t)$ which is $-\Delta f_d$ according to the rule. Therefore, Equation (2) assumes the simpler form $$F(t)=k_d \cdot d_d(t)+(\pm 2\Delta f_d)[g(r,\phi)] \text{ when } r\neq 0. \tag{4}$$

The rule used in this example can be summarized analytically as follows. When $d_s(t)$=binary 0, then $A_s$=0 volts which implies r=0 and then $F(t)=k_d \cdot d_d(t)$. When $d_s(t)$=binary 1, then F(t) is given by Equation (4).

In U.S. Pat. Nos. 5,541,959 and 5,570,395, the inventor of the present invention shows by equations and by use of a pinwheel diagram that peak frequency deviations placed like those of FIG. 10 are desirable because the spikes occurring at the output of any frequency demodulator have a polarity like that of the bit stream on the dominant carrier.

It is not necessary that the bit stream on the subdominant carrier have a rate greater than that on the dominant carrier. The rate of the bit stream on the dominant carrier can be greater than that on the subdominant carrier without affecting system operation. In this invention, it is only necessary that the bit stream rate on one carrier be an integer multiple of the bit stream rate on the other. The integer can be 1, 2, 3, etc.

Furthermore, it is not necessary that the bit streams experience abrupt transitions. The bit streams or the composite carrier can experience filtering (shaping) with the filter (shaper) output then applied to the frequency modulator, or the modulated carrier can experience bandpass filtering. The results are the same. Said results are that the bits at the output of any frequency demodulator in the receiver experience gradual transitions.

FIG. 12 shows a block diagram of a transmitter 100. The input bit stream $d_d(t)$ at a rate $R_d$ bps to be placed on the dominant carrier is applied to a frequency modulator 102, such as the Valpey Fisher VF940 series, to generate a dominant frequency modulated sinusoid. The input bit stream is also inverted in an inverter 104 and applied to the input terminal of another frequency modulator 106. A second independent bit stream $d_s(t)$ at the same rate, in this example, controls an electronic switch 108, such as a CD4066. When the voltage $d_s(t)$ represents a binary 1 (in this example), the switch 108 is closed allowing a subdominant sinusoid frequency modulated by $-d_d(t)$ to be added to the dominant FM sinusoid in a summer 110. This generates a single composite carrier. This composite carrier is then converted in frequency and amplified in a usual manner suitable for the application. An antenna completes the transmitter system.

An optional envelope conditioner 112 in FIG. 12 reduces the peak-to-peak value of any amplitude variation of the composite carrier prior to radiation. This improves power efficiency of the transmitter and noise performance of the radio communication system. Equation 1 describes the envelope variation of the sum of two sinusoids.

FIG. 13 shows the form of the envelope E(t) when r=−3 dB and for $\phi$ in the range (0, $4\pi$). The envelope can be conditioned in a variety of ways. A class C amplifier removes much of the envelope variations by virtue of its operation. A class D amplifier consisting of a hard limiter followed by a bandpass filter will provide a constant amplitude carrier at the output of the filter. A fast automatic gain control (AGC) circuit can also act as an envelope conditioner.

The bandwidth of the signal after the envelope conditioner is somewhat greater than that of its input signal. This increased bandwidth results in considerable improvement in noise performance of a practical system.

FIG. 14 shows a block diagram of a receiver 120 which is the companion to the transmitter shown in FIG. 12. The received signal is converted in frequency and amplified in an IF amplifier 122 and then limited in a hard limiter 124, as in any ordinary FM receiver, to prepare the received signal for demodulation in a frequency demodulator 126, such as Signetics NE604 integrated circuit. Since F(t) is the instantaneous frequency deviation of the composite carrier which is radiated and since the output of any frequency demodulator is a voltage linearly related to the instantaneous frequency of the sinusoidal input, then F(t) represents the voltage appearing at the output of any frequency demodulator in a receiver.

The output signal of the frequency demodulator 126 for an example in this invention is F(t) which is shown as FIG. 11. The bit on the dominant carrier can be recovered by passing the output of the frequency demodulator through a baseband hard limiter 128 which functions as an analog-to-digital converter (ADC) since the limiter output is 'high' when its input voltage is >0 (or some other predetermined value) and 'low' when its input voltage is <0. Inspection of FIG. 11 and comparison with FIG. 8 establishes that the output of the hard limiter is the bit stream $d_d(t)$ carried by the dominant sinusoid.

The series connection of any frequency demodulator and a hard limiter is commonly used to recover bit streams from single frequency modulated carriers. Consequently, a quality of this invention is operation as an ordinary single carrier per channel system or as a two carrier per channel system with no change in receiver design. A switch in the transmitter selects the mode of operation.

The spikes superimposed on $d_d(t)$ are the feature representing the bits of $d_s(t)$. The presence of a feature represents a 1 of $d_s(t)$ and its absence a 0. The existence of the peak voltage value of the spikes superimposed on the message of the dominant carrier can be used to indicate the presence of the feature voltage. The presence of these peak values can be determined in a variety of ways. In one embodiment, the output of any frequency demodulator is passed into a full-wave rectifier 130 to generate a unipolar voltage. The rectified version of FIG. 11 is shown as FIG. 15. An embodiment of a full-wave rectifier is an analog voltage multiplier, such as the Analog Devices AD734 integrated circuit, having the limiter output as one input and the output of any frequency demodulator as the other input.

A common peak voltage measuring circuit used in AM radios is an envelope detector 132. The voltage of FIG. 14 when applied to an envelope detector generates two distinct voltage levels which can be discerned and converted to digital form by a comparator 134. An Elantec 2625 operational amplifier is configured as a comparator. The other input to the comparator is a reference voltage $V_T$ having value approximately equal the mean of the two different peak values of the voltage of FIG. 15. The output of a comparator is the other independent bit stream ds(t) which can be verified by comparing the peak values of the voltage of FIG. 15 with the bit stream in FIG. 9. Other embodiments of peak voltage measuring circuits and comparators can be used in this application to recover bit stream $d_s(t)$.

Another characteristic of this invention is the absence of any adjustments in receiver operation. The reference or threshold voltage used to distinguish peak values of spike voltages is determined from knowledge of r and $\Delta f_d$ and said reference voltage is then set prior to receiver operation.

Any edge jitter occurring in the recovered voltages representing the independent bit streams $d_d(t)$ and $d_s(t)$ can be removed by recovering a clock from the output of the hard limiter. Said clock can be used with usual digital circuitry to generate clocked wave forms $d_d(t)$ and $d_s(t)$ like those present in the transmitter.

The previous example which uses a subdominant carrier added to a FM dominant carrier to generate a feature voltage can be extended to M-ary signaling. The same two dimensional constellation concept shown in FIGS. 5 and 6 applies. In the case of QAM, in-phase and quadrature carriers are used to provide two dimensions. In this invention, two or three system variables may also be used to define the points in the constellation.

With two dimensional constellations, it is necessary to have baseband voltages appearing at two nodes in the receiver. With QAM, separate coherent demodulation of the in-phase and quadrature carriers provides the two needed voltages. In one embodiment of this invention, the output of the frequency demodulator is one voltage and the output of the envelope detector in FIG. 14 is the other voltage.

This invention considers use of an auxiliary sinusoid to create a multi-valued feature as depicted in FIG. 4. Use of such an auxiliary sinusoid along with a dominant sinusoid permits three characteristics of the composite carrier which can be used in combination to transmit a group of n bits simultaneously. These characteristics are the constant value of the output of a frequency demodulator, the peak amplitude of the beat spike superimposed on the constant value and the time of occurrence of said beat spike. This creates a three dimensional constellation representing the M-ary signaling. The time of occurrence of the beat spike within a bit interval is controlled by the phase of the auxiliary sinusoid.

Two variables that define the two dimensional constellation in a preferred embodiment of this invention are amplitude ratio r of the two carriers and peak frequency deviation $\Delta f_d$ of the dominant carrier. The variable $\Delta f_d$ determines the 'pedestal' (constant) values of the output F(t) of the frequency demodulator. See FIG. 11. This pedestal value is $k_d d_d(t)$ in Equation (4). The feature voltage $g(r,\Delta)$ in Equation 4 has peak amplitude determined by r. The feature voltage when superimposed on the pedestal value is the output F(t) of the frequency demodulator. The output of the envelope detector is the peak value of F(t).

FIG. 16 shows the constellation for a 4-ary embodiment of this invention with bit assignments. The abscissa is a measure of the pedestal portion of the output of the frequency demodulator. Mark this as $F_P$. The ordinate is a measure of the output of the envelope detector. Mark this as $E_F$, the envelope of F(t). A previous example treated the simultaneous transmission of two bit streams. That example is a 4-ary version of a preferred embodiment of this invention. Only one value of r and two values of carrier frequency are needed to realize the four points in the constellation as indicated in the previous example.

The symbols in FIG. 16 are defined by the following rule. The first bit of the group defines the carrier frequency deviations as + or −. The second bit determines whether the second carrier is added. A binary one means the subdominant carrier has been added which gives rise to an interference voltage having spikes whose peak value is detected. Therefore, in FIG. 16, the symbol 11 has coordinates ($\Delta f_d$, $E_F 1$). Similarly, the symbol 00 has coordinates ($-\Delta f_d$, $-E_F 2$). This rule is that of the previous example.

In the receiver of FIG. 14, the output of the envelope detector is shown as always a positive voltage. This is consistent with the use of full-wave rectification and a single envelope detector as shown in FIG. 14. Two envelope detectors (positive envelope and negative envelope) can be used to generate a link between circuitry and the negative values of the ordinate shown in FIG. 16.

An 8-ary embodiment of the present invention can assume various forms. In one case, to send a group of 3 bits when there are two independent bit streams, it is convenient to clock one bit stream at twice the rate of the other. That is, while one bit of a stream is sent, two bits of the other are sent. The group of 3 is then defined as the one bit plus the two bits.

The transmitter and receiver hardware of one 8-ary embodiment of the present invention is essentially the same as that when the bit streams are clocked at the same rate. The only change is the addition of a clock of twice frequency in the transmitter and the creation of two clocks in the receiver. These tasks are accomplished easily with readily available hardware. Either the bit stream carried by the dominant sinusoid or the bit stream carried by the feature voltage can be clocked at twice the rate of the other. The choice depends primarily on the use to be made of the two bit streams.

Clocking one stream at twice the rate of the other increases the switching rate of the state of the composite carrier which is radiated. Therefore, there is an increase in bandwidth required to obtain the higher data throughput rate.

To depict this 8-ary embodiment of the present invention with the usual planar constellation, it is necessary to indicate transitions from one point in the constellation to the other. FIG. 17 is shown as an example. In the case shown, the left-most bit of the group of 3 is represented by the carrier deviation. The middle bit indicates the initial state of the two bit group and the right-most bit indicates the final state of the two bit group. Consider the group 101. Let $+\Delta f_d$ represent a binary 1. Let the presence of a feature voltage (superimposed spikes) represent a binary 1. So, 101 is positioned at $F=+\Delta f_d$ (left bit) with a small initial value of envelope $E_F$ (middle bit) which then transitions to a large value of envelope $E_F$ (right bit) as shown in FIG. 17. If the middle and right bits are the same, then a point in the constellation transitions to itself (no change).

This example considers the subdominant carrier as being switched at twice the rate. In this case, the transitions in the constellation are vertical. When the dominant carrier is switched at twice the rate, then the abscissa becomes one value of deviation or the other and the transitions become horizontal in the constellation plane.

An 8-ary embodiment of the present invention can be used to send three bits at a time when there is but one bit stream involved. This requires 8 points of the constellation formed in the $F_P, E_F$ plane. A possible use of these two variables is shown as FIG. 18. Four values of frequency and two values of r are used. A binary one for the left-most bit of the group implies positive values of $F_P$. A large excursion of $F_P$ corresponds to a binary one for the middle bit. A right-most bit of one implies r≠0 (beat spikes are present).

This same 8-ary embodiment of the present invention having FIG. 18 as an example can also be used to send three independent bit streams simultaneously where each bit stream is clocked at the same rate. The left-most bit of a symbol in FIG. 18 can be that of the first stream. The middle bit, that of the second stream. The right-most bit, that of the third stream.

An alternative embodiment of an 8-ary system according to this invention can be generated from inspection of Equation (2). There, $[k_d \cdot d_d(t) - k_s \cdot d_s(t)]$ is the instantaneous difference in frequency of the dominant carrier and the subdominant carrier. In previous inventions by the inventor of this invention, this is called a beat frequency $f_B$ Hz. Therefore, Equation (2) becomes $$F(t) = k_d \cdot d_d(t) + f_B \cdot g(r, \phi). \tag{5}$$

The peak value of the spikes due to $g(r,\phi)$ are determined by $f_B$ and r. Differing values of $f_B$ result in differing peak values of the voltage spikes for a fixed value of r. A means of obtaining different values of $f_B$ is having available sub-dominant sinusoids of differing values of frequency.

As an example, consider the selection of available frequencies shown in FIG. 19. The long arrow represents the dominant carrier. The short arrows indicate available subdominant carriers. The constellation of FIG. 20 for this example is formed by setting $E_F=1$ volts when $F_P=k_d \cdot d_d = \Delta f_d$. A single value of r=0.6 (−4.4 dB) for all three possible choices of frequency of the subdominant sinusoid gives values of $E_F=2$, 3 and 4 volts. FIG. 21 shows the output F(t) of any frequency demodulator for this example. Twelve bits are included in FIG. 21. The value of 1 volt represents the group 100. The spikes having peak value of 2 volts are formed from the sum of sinusoids 1 and 2 in FIG. 19, and 2 volts represents the group 101. Those of 3 volts, from the sum of sinusoids 1 and 3 representing 111 and those of 4 volts, from the sum of sinusoids 1 and 4 representing 110.

In the transmitter, the left most bit of the group determines whether the dominant carrier is deviated $+\Delta f_d$ or $-\Delta f_d$ Hz from the carrier frequency. If the remaining two bits are 00, no subdominant sinusoid is added. Combinations 01, 10 and 11 determine the frequency of the subdominant sinusoid which is added to the dominant sinusoid. In the receiver, the output of the envelope detector consists of the four voltage levels 1, 2, 3 and 4 volts. These must be distinguished to recover the 4 possible symbols. Similarly for the negative envelope detector.

The 8-ary embodiments represented in FIGS. 18 and 20 can be extended to 16-ary, 32-ary, etc. representations of radio communication systems using feature voltages generated by the addition of two sinusoids by selecting various sets of values or r, dominant carrier frequency deviation $\Delta f_d$ Hz, beat frequency $f_B$ Hz and/or time of occurrence of the beat spike within the bit interval.

A 16-ary embodiment is possible using just the four frequencies of FIG. 19 when the amplitudes of the subdominant carriers are taken so that the peak value of the sinusoid labeled 4 is less than that of the sinusoid labeled 3 which is less than that of the sinusoid labeled 2. The following eight combinations of sinusoids will yield eight different positive values of $E_F$: (1 only), (2 only), (1 and 2), (1 and 3), (1 and 4), (2 and 3), (2 and 4). Reversing the order of the sinusoids of FIG. 19 will yield a mirror set of eight different negative values of $E_F$. The result is 16 distinguishable values of $E_F$.

FIG. 22 is a block diagram of a transmitter 140 which can be used to transfer multiple bit streams while using numerically controlled oscillators (NCOs). The first input bit stream selects a sinusoid having one of two frequencies as output of a first NCO 142. The remaining bit streams are applied to the input terminals of a register 144 where they are held and where they form a symbol which selects appropriate values of phase and frequency of a sinusoid appearing at the output terminal of a second NCO 146. Logic circuitry 148 maps the symbols to appropriate binary states of the input terminals of the second NCO 146. The output signals of the first and the second NCOs 142, 146 are added in a summer 150 to provide a composite carrier which is then converted in frequency and amplified in a usual manner suitable for a particular application.

FIG. 23 is a graph of a three dimensional constellation formed by using two values $f_1$ and $f_2$ of frequency of a FSK first carrier and the same two values of frequency of a FSK second carrier. The two possible values of frequency represent one bit of a group. The second carrier has two possible amplitude values which result in two values of r in Equation 3. The result is a spike voltage having two positive extreme values labeled $A_1$ and $A_2$ in FIG. 22. The two possible values of amplitude represent a second bit of a group. The first and second carriers have two possible values of initial phase which result in two possible values $P_1$ and $P_2$ of position of the extreme values of the spike voltage. The two possible values of position represent a third bit of a group. In this manner, each point of the constellation of FIG. 22 represents a group of three bits. The $2^3=8$ possible combinations of the three bits are identified in FIG. 22 which is an 8-ary voltage constellation.

FIG. 24 is an example of four possible positions of an extreme value of a spike voltage within the duration of a symbol consisting of a group of two bits. In that figure, the region of said extreme value is translated into a binary indication of position through use of a comparator. The comparator output can exist in the first quarter in time of the symbol, in the second quarter, in the third quarter or in the fourth quarter as shown in FIG. 24.

The frequency, relative amplitude and relative phase of the first and second carriers can be used to create other 8-ary voltage constellations as well as a variety of 16-ary, 32-ary, 64-ary, etc. voltage constellations. Use of two frequencies, four amplitude levels and four positions creates a 32-ary voltage constellation, for example.

Common NCOs have two frequency registers and four phase registers. One frequency register is loaded by means of a processor or controller with a binary word which determines the frequency of the waveform appearing at the output of the NCO when that filled register is activated. In a like manner, the second frequency register determines the frequency of the output waveform when that filled register is activated. Only one register can be activated at a time. In a like manner, the phase registers are programmed and their contents determine one of four possible values of initial phase of the output waveform.

In the application which is the subject of this invention, one frequency register of a first NCO is programmed to provide a waveform having a frequency corresponding to the peak frequency deviation of the modulated first carrier. The second frequency register is programmed to provide a waveform having frequency corresponding to the peak negative frequency deviation of the modulated first carrier. The first bit stream is used to activate the appropriate register. In this manner, a frequency shift keyed (FSK) carrier of constant and precise frequency is created. Choice of phase of the NCO output waveform is arbitrary in a typical FSK application.

A second NCO is programmed in the exact manner as the first NCO. The second bit stream may be logically combined with the first bit stream to create a third bit stream which activates the appropriate register. In this manner, a second FSK carrier having values of frequency identical to that of the first FSK carrier is created. Such precise, constant and identical values of frequency of two waveforms can be created only by use of NCOs.

With NCOs used as frequency modulators in the application which is the subject of this invention, it is not necessary to switch in and out a second modulated carrier. The open condition of the switch is equivalent to adding the second modulated carrier to the first modulated carrier when the output waveforms of the two NCOs have identical values of frequency and initial phase. The sum of such first and second modulated carriers differs only in amplitude from either the first or second modulated carrier.

The position of the extreme value of the voltage spike can be used to create 8-ary, 16-ary, 32-ary, 64-ary, etc. embodiments of the present invention. Said position can be controlled by choosing values of initial phase of the outputs of NCOs one and two used to generate the first and second frequency modulated carriers. The phase of the output of NCO one or that of NCO two or that of both can be selected by the states of the bit streams to be transferred. The initial phase difference of the two NCO outputs determines at what region of time within a symbol duration the conditions of destructive and constructive interference of the first and second carriers will occur. These interference conditions give rise to the extreme values of the feature created by the addition of the first and second frequency modulated carriers. The position within a symbol duration of the extreme values can be determined in a receiver and translated to an appropriate group of bits.

The envelope variation of FIG. 13, which is created by the addition of a subdominant carrier and a dominant carrier, can be used as a feature rather than the frequency variation represented by FIG. 7. A possible rule is as follows. When $d_s(t)$ is a binary 1, add a subdominant carrier to the dominant carrier to create an envelope variation. In the receiver, distinguish the envelope variation from the constant value of the dominant carrier only. Either the maximum or the minimum of the envelope variation can be used to recognize the feature. Envelope detection of the output of the IF amplifier in FIG. 14 recovers the constant value of the dominant carrier or the envelope variation of the sum of the two sinusoids. A comparator circuit provides a digital indication of the presence or absence of the envelope feature. The presence of the envelope feature translates to a decision of a binary 1 for $d_s(t)$. A suitable threshold voltage is applied to the comparator.

FIG. 25A shows a transmitter for a system which uses an envelope as a feature. The transmitter is similar to that of FIG. 12 except that, when the envelope is used as a feature, then the envelope conditioner circuit of FIG. 12 is not used.

FIG. 25B shows a receiver having an envelope feature detector. The receiver circuit of FIG. 14 is modified. The receiver is similar to that of FIG. 14 except that, when the envelope is used as a feature, the fill-wave rectifier is not used. An envelope detector operates in parallel with the frequency demodulator (rather than in series when using the frequency variation as a feature). The envelope detector input is the output of the IF amplifier. The envelope detector output is applied to a comparator which has as its input a binary indication of the bit stream $d_s(t)$. FIG. 25B is a block diagram of a receiver having envelope feature detection. The receiver of FIG. 25B is similar to that of FIG. 14 with the exception that the input signal to the envelope detector 132 is obtained directly from the IF amplifier 122.

In an embodiment of the present invention, the feature is generated by adding a subdominant carrier to the dominant carrier. A feature can also be generated by modifying a bit stream (changing the two-level voltage representation) prior to carrier modulation, for example. A feature may also be generated by suitable additional modulation of a carrier for one of the binary digits or symbols.

In an embodiment of the present invention, the feature detector is an envelope detector. Various other feature detectors can be used depending on the nature of the feature voltage. Examples include matched filters, pattern recognizers, neural networks and digital signal processors.

Coding methods can be applied to the constellations generated using feature voltages.

In bit and symbol transmission systems, error control coding is often implemented to improve power efficiency. Such coding involves use of block codes, convolutional codes, trellis codes, for example. Several decoding methods use the constellation nature of the transmission to correct errors. These same coding methods can be applied to the constellations generated using feature voltages.

In various alternative embodiments of the invention, all or parts of the transmitter functions as well as all or parts of the receiver functions for recovering the individual bits of the various independent bit streams are obtained using computational routines provided by software in a programmed computational device. These routines emulate the receiver and transmitter functions. The organization and structure of such routines use conventional block diagrams of transmitters and receivers as flow charts for signal processing. Each of the functions of frequency demodulation, limiting, feature detection and voltage comparison is achieved using a variety of algorithms for each of such functions.

If necessary, an analog-to-digital converter (ADC) can be used to interface a continuous input voltage signal to computer code words processed by such routines. Similarly, a digital-to-analog converter (DAC) can be used to interface computer code words to a continuous output voltage.

Alternatively, a computer implemented routine can operate on the output F(t) of a frequency demodulator and the outputs of other demodulators to recover the bit streams directly by suitable sampling of F(t). Processing with appropriate algorithms these samples to distinguish the various feature voltages and/or determine their presence or absence or position within a bit when present will identify the bit or group of bits transmitted.

While the present invention has been particularly shown and described with respect to a certain preferred embodiment thereof, it should be readily apparent to those of ordinary skill in the art that various changes and modifications in form and detail may be made without departing from the spirit and scope of the invention as set forth in the appended claims. In particular, for example, other circuit configurations can be used to extract from the output of any frequency demodulator voltages necessary to generate the transmitted bit streams. Sampling and digital signal processing circuits can be used to accomplish the required result as described in the invention. Also, circuitry may be simplified when other prior information about the bit streams and any possible relations thereof are known. The principles of the invention apply to bit streams having unrelated clock rates. The invention can be used when the bit streams are filtered or shaped prior to carrier modulation. The invention illustratively disclosed herein may be practiced in the absence of any element which is not specifically disclosed herein. The invention is not limited to the embodiments disclosed herein and may be practiced using other techniques such as, for example, DSP or software implementations of circuit or system functions.

I claim:

1. A method of simultaneously providing in the same frequency band a first data stream along with other independent data streams, comprising the steps of:

modulating a first carrier with a first data stream to provide a modulated first carrier; and imposing a distinguishable feature on the modulated first carrier to provide distinguishable values of a feature, which distinguishable values of the feature represent at least one other independent data stream, wherein said distinguishable feature includes times of occurrence.

2. The method of claim 1 further including:

transmitting the modulated first carrier with the distinguishable values of a feature through a transmission medium;

receiving the transmitted modulated first carrier with the distinguishable values of a feature to provide a received modulated first carrier with a feature;

demodulating the received modulated first carrier with distinguishable values of a feature to provide the first data stream; and detecting the distinguishable values of a feature of the received modulated first carrier having distinguishable values of a feature to provide the other independent data streams.

3. The method of claim 1 including the step of clocking the data streams at rates which are integer multiples of each other.

4. A method of simultaneously providing in the same frequency band a first data stream along with other independent data streams, comprising the steps of:

modulating a first carrier with a first data stream to provide a modulated first carrier; and using an auxiliary sinusoid to provide a distinguishable feature imposed on the modulated first carrier to provide distinguishable values of the feature of the modulated first carrier, which distinguishable values of the feature represent at least one other independent data stream, wherein said distinguishable feature includes time of occurrence.

5. The method of claim 4 including using the envelope values of a composite carrier formed by the first carrier combined with an auxiliary sinusoid to provide distinguishable values of a feature.

6. The method of claim 4 including using the frequency values of the composite carrier formed by the modulated first carrier combined with an auxilary sinusoid to form distinguishable values of a feature.

7. A data communication system for simultaneously communicating independent first and other data streams, comprising:

a modulator for modulating a first carrier with a first data stream to provide a modulated first carrier; and means for imposing distinguishable values of a feature on the modulated first carrier to represent at least one other data stream, wherein said distinguishable values include time of occurrence.

8. The system of claim 7 further including:

a transmitter for transmitting the modulated first carrier with the distinguishable values of a feature imposed thereon through a transmission medium;

a receiver for receiving the transmitted modulated first carrier with the distinguishable values of a feature to provide a received modulated first carrier with the feature;

a demodulator for demodulating the received modulated first carrier with feature to provide a first output signal representing the first data stream; and a detector for detecting the distinguishable values of a feature of the received modulated first carrier with feature to provide at least one other data stream.

9. The system of claim 7 wherein the first and other data streams are clocked at rates which are integer multiples of each other.

10. A method of simultaneously communicating a first data stream along with other data streams, comprising the steps of:

modulating a first carrier with a first data stream to provide a modulated first carrier;

imposing a distinguishable multi-valued feature on the modulated first carrier to provide distinguishable values of the feature, which values represent two or more other independent data streams; wherein said distinguishable multi-valued feature includes time of occurrence;

transmitting the modulated first carrier with the distinguishable multi-valued feature through a transmission medium;

receiving the transmitted modulated first carrier with the distinguishable values of the multi-valued feature to provide a received modulated first carrier with said distinguishable values of the feature;

demodulating the received modulated first carrier with the distinguishable values to provide the first data stream; and detecting the distinguishable values of the multi-valued feature to provide the two or more other independent data streams.

11. The method of claim 10 including the step of clocking the data streams at rates which are integer multiples of each other.

12. The method of claim 10 including the step of simultaneously transmitting M-ary information by simultaneously transmitting groups of 2 or more bits of the other independent data streams wherein each group of 2 or more bits defines a symbol and wherein the number of distinct symbols equals $2^n$ where n is the number of bits.

13. A data communication system for simultaneously communicating an independent first and other data streams, comprising:

a modulator for modulating a first carrier with a first data stream to provide a modulated first carrier;

means for imposing a distinguishable multi-valued feature on the modulated first carrier to provide distinguishable values of the feature, which values represent two or more other independent data streams; wherein said distinguishable multi-valued feature includes time of occurrence;

a transmitter for transmitting the modulated first carrier with distinguishable multi-valued feature through a transmission medium;

a receiver for receiving the transmitted modulated first carrier with the distinguishable values of the feature to provide a received modulated first carrier with said distinguishable values of the feature;

a demodulator for demodulating the received modulated first carrier to provide a first output signal representing the first data stream; and a detector for detecting distinguishable values of the multi-value feature to provide two or more other independent data streams, wherein the multi-valued feature of the modulated first carrier which is used to represent the other data streams includes the time of occurrence of constructive and destructive interference conditions of the modulated first carrier.

14. The system of claim 13 wherein the first data stream and the other independent data streams are clocked at rates which are integer multiples of each other.

15. The data communication system of claim 13 including means for simultaneously transmitting M-ary information by simultaneously transmitting groups of 2 or more bits of the other independent data streams wherein each group of 2 or more bits defines a symbol and wherein the number of distinct symbols equals $2^n$ where n is the number of bits.

16. A method for transmitting and receiving independent bit streams from two co-channel frequency-modulated carriers, comprising the steps of:

frequency modulating a first sinusoidal signal with a first input bit stream to provide a first frequency-modulated carrier signal;

identifying an input symbol associated with the binary state of a second bit stream;

frequency modulating a second sinusoidal signal with said identified input symbol to provide a second frequency-modulated carrier signal having selected values of amplitude and initial phase;

summing the first and the second frequency-modulated carrier signals to provide a combined transmitter signal;

frequency demodulating a replica of the combined transmitter signal to provide a frequency-demodulated signal, wherein the frequency-demodulated signal is comprised of the first input bit stream;

limiting the frequency-demodulated signal to provide an output signal corresponding to the first input bit stream;

detecting the spike characteristics including peak amplitude and position within a bit of the frequency-demodulated signal to provide an indication of the state of the input symbol;

converting the values of spike amplitude and position to binary states to provide an output symbol corresponding to the input symbol; and wherein each of the multiple independent bit streams are recovered from the single composite power multiplexed sinusoidal carrier.

17. The method of claim 16 wherein the step of detecting the spike characteristics includes peak-voltage detecting and position detecting the voltage spikes of the frequency-demodulated signal.

18. The method of claim 16 wherein the input bit streams are clocked from a common timing reference signal in the transmitter.

19. The method of claim 18 wherein the input bit streams have data rates which are integer multiples of each other.

20. A system for transmitting and receiving independent bit streams from a composite modulated carrier, comprising:

a transmitter including:
a first system input terminal for receiving a first input bit stream;
a first frequency modulator including a numerically controlled oscillator coupled to the first system input terminal for receiving the first input bit stream and having an output terminal at which is provided a first sinusoidal signal of known initial phase, which sinusoidal signal is frequency modulated by the first input bit stream;
a summer having a first and second input terminal and an output terminal, wherein the output terminal of the first frequency modulator is coupled to the first input terminal of the summer;
other system input terminals for receiving the remaining input bit streams, which define the symbol to be transmitted;
a data register having output terminals and input terminals coupled to the other system input terminals;
logic circuitry having output terminals and input terminals coupled to the data register output terminals;
a second frequency modulator including a numerically controlled oscillator whose input terminals are coupled to the logic circuitry output terminals and having an output terminal at which is provided a second sinusoidal signal having values of initial phase and amplitude determined by the contents of the data register, which sinusoidal signal is frequency modulated by the output of the logic circuitry;
wherein the output terminal of the second frequency modulator is coupled to the second input terminal of the summer;
wherein the output signal of the summer is a composite carrier which is transmitted; and
wherein the power of the first sinusoidal signal is greater than the power of the second sinusoidal signal; and a receiver, including:
an RF/IF amplifier having an output terminal at which is provided a replica of the transmitted composite carrier;
a frequency demodulator having an input terminal for receiving the output of the RF/IF amplifier, the frequency demodulator having an output terminal at which is provided a frequency-demodulated signal which is comprised of the bit stream on the stronger carrier on which are superimposed voltage spikes wherein said voltage spikes have characteristics which include amplitude, position and rate characteristics;
a limiter having an input terminal coupled to the output terminal of the frequency demodulator, said limiter having an output terminal at which is provided an output signal corresponding to the first input bit stream;
a detector having an input terminal coupled to the output terminal of the frequency demodulator for receiving the superimposed voltage spikes and measuring the times of occurrence of said voltage spikes, said detector having output terminals at which are provided the remaining bit streams; and
wherein the independent bit streams are recovered from a single composite transmitted carrier.

21. The system of claim 20 wherein the input bit streams are clocked from a common timing reference signal in the transmitter.

22. The system of claim 21 wherein the input bit streams have data rates which are integer multiples of each other.

* * * * *